(12) United States Patent
Huntsberger et al.

(10) Patent No.: US 8,141,668 B2
(45) Date of Patent: Mar. 27, 2012

(54) CHILDREN'S RIDE-ON VEHICLE

(75) Inventors: Kurt J. Huntsberger, Chaffee, NY (US); John L. Jones, Jr., East Aurora, NY (US); William R. Howell, Chaffee, NY (US); Karl D. Lerch, East Aurora, NY (US); Brian L. Bienz, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 340 days.

(21) Appl. No.: 12/419,270

(22) Filed: Apr. 6, 2009

(65) Prior Publication Data
US 2009/0229896 A1 Sep. 17, 2009

Related U.S. Application Data

(63) Continuation of application No. 11/824,962, filed on Jul. 2, 2007, now Pat. No. 7,530,411, which is a continuation of application No. 11/213,230, filed on Aug. 26, 2005, now abandoned, which is a continuation of application No. 10/877,945, filed on Jun. 25, 2004, now Pat. No. 6,994,179, which is a continuation of application No. 10/000,509, filed on Oct. 30, 2001, now Pat. No. 6,755,265, which is a continuation-in-part of application No. 09/665,195, filed on Sep. 18, 2000, now Pat. No. 6,656,010, which is a continuation-in-part of application No. 09/245,579, filed on Feb. 5, 1999, now Pat. No. 6,120,345.

(51) Int. Cl.
*B60K 20/00* (2006.01)

(52) U.S. Cl. ............... 180/65.1; 180/65.8; 318/139

(58) Field of Classification Search ............ 180/65.1, 180/65.8, 65.51, 65.285; 318/139
See application file for complete search history.

(56) References Cited

U.S. PATENT DOCUMENTS 628,862 A 7/1899 Smith
(Continued)

FOREIGN PATENT DOCUMENTS

DE 198094 11/1906
(Continued)

OTHER PUBLICATIONS

Office Action issued in Brazilian National Stage Application of PCT Application PCT/US00/02970.
(Continued)

*Primary Examiner* — Jeffrey J Restifo
(74) *Attorney, Agent, or Firm* — Dascenzo Intellectual Property Law, P.C.

(57) ABSTRACT

Children's ride-on vehicles. The ride-on, or ride-on vehicle, includes a frame having a seat adapted to support a child, and a drive assembly with a battery-powered motor assembly. The ride-on vehicle further includes one or more steerable wheels and one or more driven wheels. In some embodiments, the ride-on vehicle includes a biasing assembly that is connected to the frame and adapted to bias the seat away from the vehicle's driven wheels. In some embodiments, the ride-on vehicle includes a free-floating wheel, which is unbiased and travels within a defined range of positions with respect to the ride-on vehicle's frame as external forces are imparted to the wheel. In some embodiments, the ride-on vehicle includes a high-speed switch positioned for momentary high-speed operation of the ride-on vehicle and a user-manipulable portion may be provided to enable a child to select such a high-speed configuration.

20 Claims, 11 Drawing Sheets

U.S. PATENT DOCUMENTS

| | | | |
|---|---|---|---|
| 674,577 A | 5/1901 | Fowl | |
| 777,424 A | 11/1904 | Henderson | |
| 1,088,028 A | 2/1914 | Johnston | |
| 1,262,806 A | 4/1918 | Kemble | |
| 1,397,675 A | 11/1921 | Buske | |
| 1,429,249 A | 9/1922 | Parker | |
| 1,571,489 A | 2/1926 | Morihata | |
| 2,054,842 A | 9/1936 | Walker | |
| 2,419,178 A | 4/1947 | Strong | |
| 2,485,770 A | 10/1949 | Place | |
| 2,664,941 A | 1/1954 | Gillespie | |
| 2,709,471 A | 5/1955 | Smith et al. | |
| 2,717,807 A | 9/1955 | Kapp | |
| 2,921,344 A | 1/1960 | Carrico | |
| 2,960,351 A | 11/1960 | Jeffress | |
| 2,978,277 A | 4/1961 | Gaudry | |
| 3,166,141 A | 1/1965 | Shields et al. | |
| 3,236,323 A | 2/1966 | Austin | |
| 3,415,539 A | 12/1968 | Stevens | |
| 3,416,625 A | 12/1968 | Narutani | |
| 3,572,621 A | 3/1971 | Whitten et al. | |
| 3,732,671 A | 5/1973 | Allen et al. | |
| 3,790,220 A | 2/1974 | Manss | |
| 3,828,876 A | 8/1974 | Morelli | |
| 3,874,700 A | 4/1975 | Lohr et al. | |
| 3,917,270 A | 11/1975 | Gothard, Jr. et al. | |
| 3,952,786 A | 4/1976 | Kreling et al. | |
| 4,087,107 A | 5/1978 | Winchell | |
| 4,153,303 A | 5/1979 | Tanner | |
| 4,191,065 A | 3/1980 | Golobay et al. | |
| 4,203,500 A | 5/1980 | Kamiya | |
| 4,229,018 A | 10/1980 | Chika | |
| 4,313,511 A | 2/1982 | Soo Hoo | |
| 4,352,303 A | 10/1982 | Christner | |
| 4,399,883 A | 8/1983 | Todokoro | |
| 4,484,646 A | 11/1984 | Smith | |
| 4,494,763 A | 1/1985 | Whitehead | |
| 4,498,887 A | 2/1985 | Cook | |
| 4,513,981 A * | 4/1985 | DeGraaff et al. | 280/828 |
| 4,558,263 A | 12/1985 | Harris et al. | |
| 4,560,022 A | 12/1985 | Kassai | |
| 4,562,893 A * | 1/1986 | Cunard | 180/6.5 |
| 4,639,646 A * | 1/1987 | Harris et al. | 318/139 |
| 4,736,648 A * | 4/1988 | Perego | 74/519 |
| 4,739,851 A | 4/1988 | Perego | |
| 4,759,557 A | 7/1988 | Kassai | |
| 4,775,021 A | 10/1988 | Marino | |
| 4,826,194 A | 5/1989 | Sakita | |
| 4,900,095 A | 2/1990 | Brubaker | |
| 4,944,563 A | 7/1990 | Pinchbeck et al. | |
| 4,997,232 A | 3/1991 | Johnsen | |
| 5,062,617 A | 11/1991 | Campbell | |
| 5,071,150 A | 12/1991 | Conrad | |
| 5,117,885 A | 6/1992 | Crawford | |
| 5,143,427 A | 9/1992 | Dick | |
| 5,173,591 A * | 12/1992 | Perego | 200/61.88 |
| 5,308,152 A | 5/1994 | Ho | |
| 5,316,259 A | 5/1994 | Pawlykowych et al. | |
| 5,319,996 A | 6/1994 | Harris | |
| 5,324,058 A | 6/1994 | Massaro | |
| 5,344,170 A | 9/1994 | Ochoa | |
| 5,387,025 A | 2/1995 | Denisar | |
| 5,439,071 A | 8/1995 | Rodriguez-Ferre | |
| 5,497,056 A * | 3/1996 | Kurland et al. | 318/269 |
| 5,501,292 A | 3/1996 | Kawashima et al. | |
| 5,524,501 A | 6/1996 | Patterson et al. | |
| 5,533,899 A | 7/1996 | Young | |
| 5,551,753 A | 9/1996 | Glockl | |
| 5,571,999 A * | 11/1996 | Harris | 200/565 |
| 5,575,489 A | 11/1996 | Oyen et al. | |
| 5,644,114 A * | 7/1997 | Neaves | 200/6 R |
| 5,662,000 A | 9/1997 | Patterson et al. | |
| 5,713,588 A | 2/1998 | Cummins | |
| 5,765,871 A | 6/1998 | Wyman et al. | |
| 5,794,713 A | 8/1998 | Berscheid | |
| 5,826,948 A | 10/1998 | Schroeder et al. | |
| 5,859,509 A * | 1/1999 | Bienz et al. | 318/139 |
| 5,911,430 A | 6/1999 | Wuschke | |
| 5,924,713 A | 7/1999 | Li | |
| 6,056,077 A | 5/2000 | Kobayashi | |
| D428,068 S | 7/2000 | Lerch | |
| 6,095,543 A | 8/2000 | McMahon et al. | |
| 6,114,668 A | 9/2000 | Ogata et al. | |
| 6,120,345 A | 9/2000 | Lenihan et al. | |
| 6,144,125 A | 11/2000 | Birkestrand et al. | |
| D437,007 S | 1/2001 | Lerch | |
| 6,206,396 B1 | 3/2001 | Smith | |
| 6,218,804 B1 | 4/2001 | Toriyama et al. | |
| 6,296,266 B1 | 10/2001 | Martin | |
| 6,308,590 B1 | 10/2001 | Berto | |
| 6,377,016 B1 | 4/2002 | Strong | |
| 6,405,817 B1 | 6/2002 | Huntsberger et al. | |
| 6,408,967 B1 | 6/2002 | Huntsberger et al. | |
| 6,422,330 B1 * | 7/2002 | Harris | 180/65.1 |
| 6,470,982 B2 | 10/2002 | Sitarski et al. | |
| 6,508,320 B2 | 1/2003 | Huntsberger et al. | |
| 6,508,322 B2 | 1/2003 | Dignitti et al. | |
| 6,656,010 B1 | 12/2003 | Bienz et al. | |
| 6,755,265 B2 | 6/2004 | Huntsberger et al. | |
| 6,771,034 B2 * | 8/2004 | Reile et al. | 318/139 |
| 7,195,271 B2 * | 3/2007 | Howell et al. | 280/504 |
| 7,207,588 B2 * | 4/2007 | Bergum et al. | 280/446.1 |
| 7,487,850 B2 * | 2/2009 | Lucas et al. | 180/65.1 |
| 7,621,552 B2 * | 11/2009 | Bergum et al. | 280/446.1 |
| 2004/0099080 A1 | 5/2004 | Hsu | |

FOREIGN PATENT DOCUMENTS

| | | |
|---|---|---|
| FR | 2413983 | 8/1979 |
| FR | 2414411 | 10/1979 |
| FR | 2562804 | 1/1985 |
| FR | 2562842 | 10/1985 |
| GB | 185153 | 9/1922 |
| WO | WO 98/29939 | 7/1998 |
| WO | WO 00/45922 | 8/2000 |
| WO | WO 01/56871 | 8/2001 |

OTHER PUBLICATIONS

Colombian Office action No. 9498 issued in Colombian National Stage Application of PCT Application PCT/US02/34823.

Foreign agent's summary of Colombian Office action No. 9498 issued in Colombian National Stage Application of PCT Application PCT/US02/34823.

Peg-Pérego Catalog, 1999.

* cited by examiner

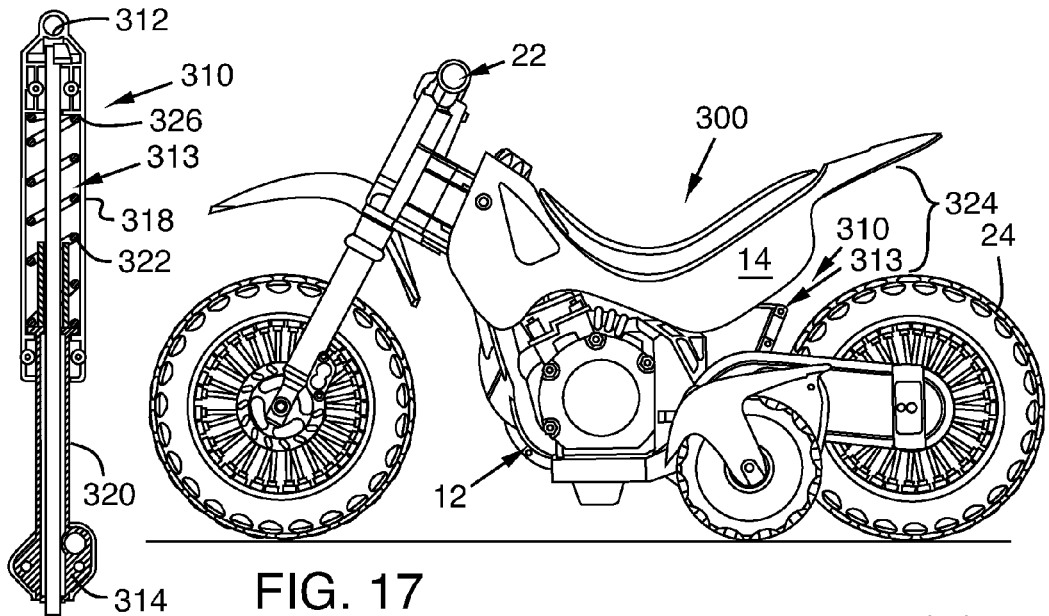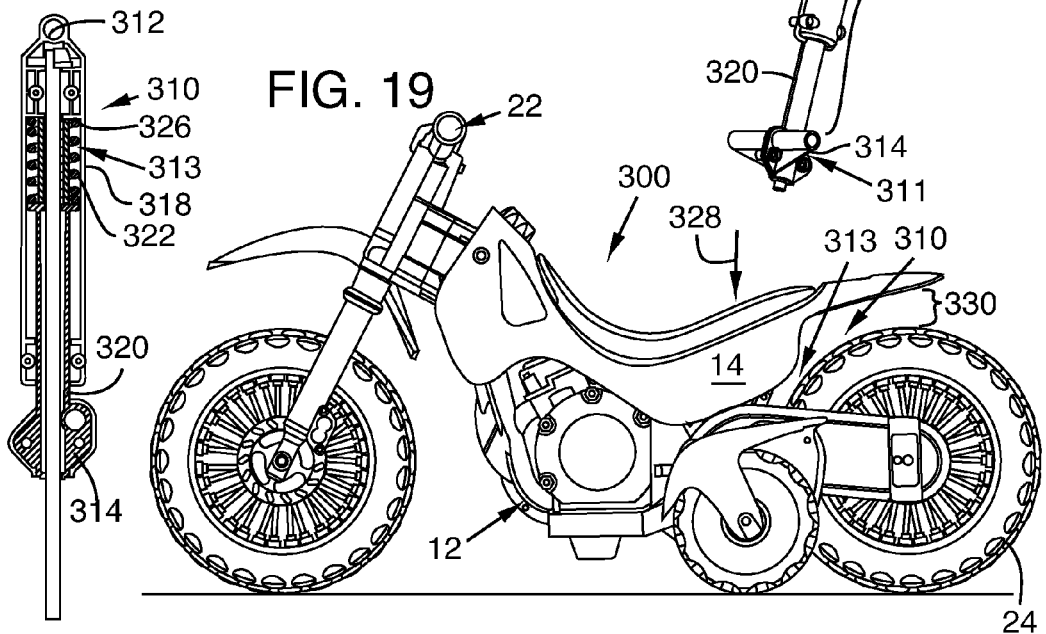

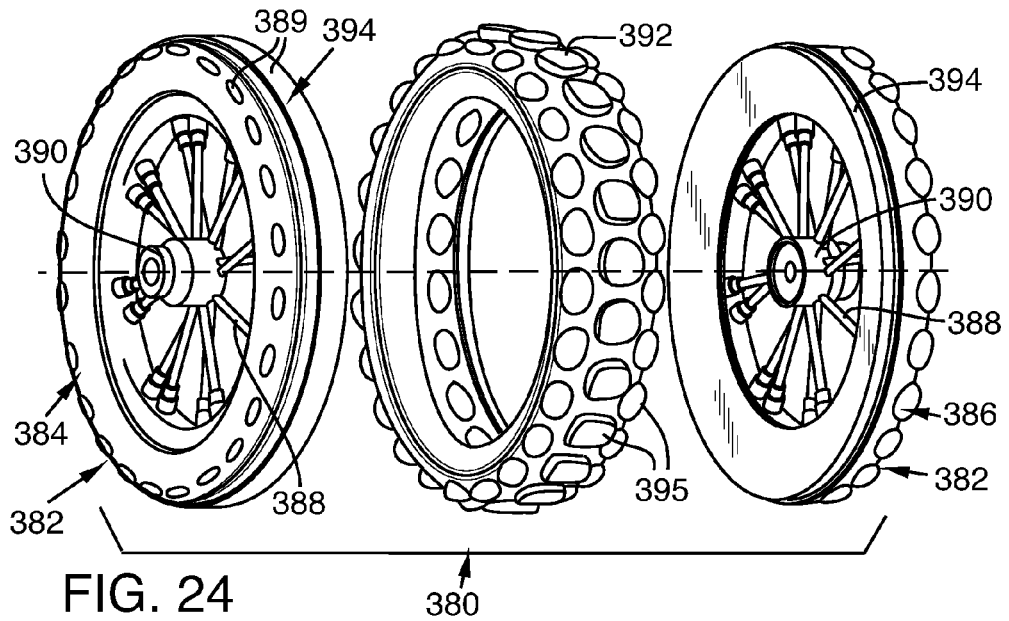
FIG. 24
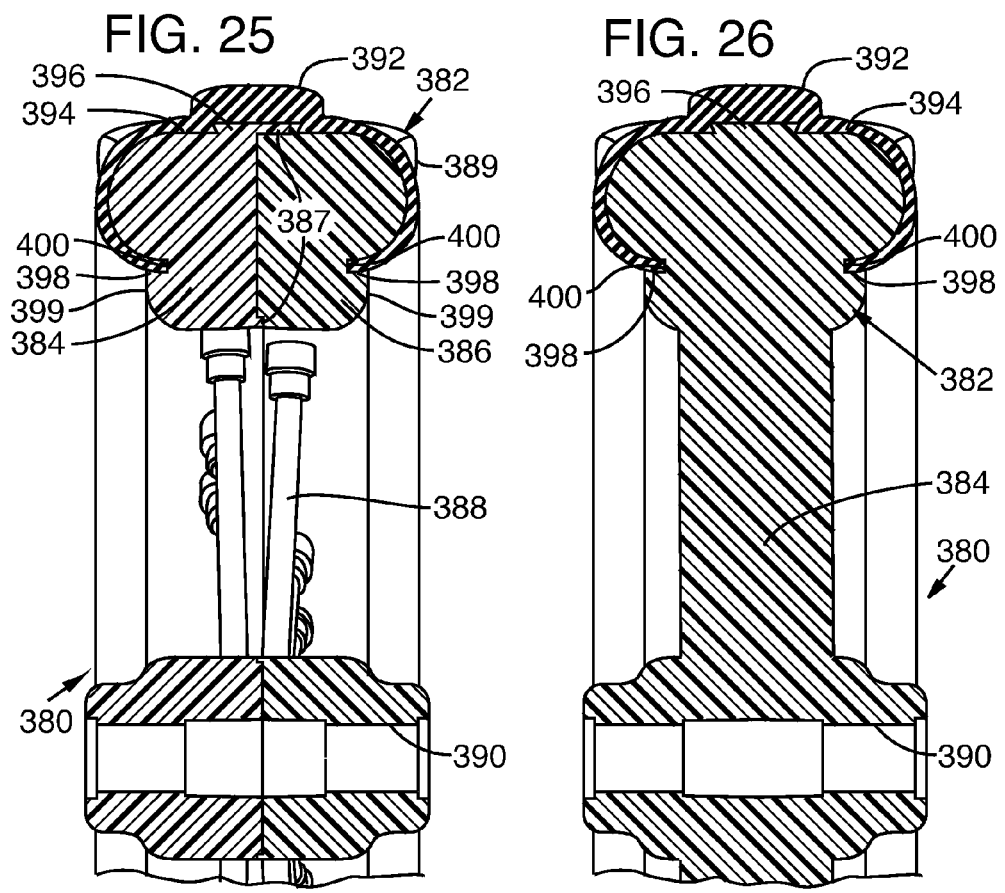
FIG. 25
FIG. 26

CHILDREN'S RIDE-ON VEHICLE

RELATED APPLICATIONS

This application is a continuation of U.S. patent application Ser. No. 11/824,962, which was filed on Jul. 2, 2007 now U.S. Pat. No. 7,530,411, which is a continuation of and claims priority to U.S. patent application Ser. No. 11/213,230, which was filed on Aug. 26, 2005 now abandoned, which is a continuation of U.S. patent application Ser. No. 10/877,945, which was filed on Jun. 25, 2004, issued on Feb. 7, 2006 as U.S. Pat. No. 6,994,179, and which is a continuation of U.S. patent application Ser. No. 10/000,509, which was filed on Oct. 30, 2001, issued on Jun. 29, 2004 as U.S. Pat. No. 6,755,265, and which is a continuation-in-part application of U.S. patent application Ser. No. 09/665,195, which was filed on Sep. 18, 2000, issued on Dec. 2, 2003 as U.S. Pat. No. 6,656,010, and which is a continuation-in-part of U.S. patent application Ser. No. 09/245,579, which was filed on Feb. 5, 1999, and issued on Sep. 19, 2000 as U.S. Pat. No. 6,120,345. The complete disclosures of the above-identified patent applications are hereby incorporated by reference for all purposes.

FIELD OF THE DISCLOSURE

The disclosure relates generally to children's ride-on vehicles, and more particularly to features that may be incorporated into manually and electrically powered children's ride-on vehicles and children's ride-on vehicles incorporating the same.

BACKGROUND AND SUMMARY OF THE DISCLOSURE

Ride-on vehicles for children have become increasingly popular due in part to the desire of children to drive self-propelled vehicles resembling full-size vehicles. Such ride-on vehicles, or ride-ons, are typically propelled by battery-powered motors and generally include scaled-down features of full-size vehicles.

One challenge in designing reduced-scale vehicles is to make the vehicle resemble a full-size vehicle, while still providing a vehicle that is safe for use by children. When a ride-on is designed to resemble a four-wheeled vehicle, such as a car or truck, the corresponding ride-on tends to also have four wheels. When a ride-on is designed to resemble a motorcycle, however, a balance must be reached between safety and the accuracy of the reproduction. Certainly the most accurate reproduction is for the ride-on to only have two wheels. However, children may not have the size, strength or coordination to balance a two-wheeled ride-on, especially when propelled by the ride-on's motor. Adding additional wheels to the ride-on detracts from the accuracy of the reproduction, and thus may reduce the child's desire for the ride-on.

The invented ride-on, or ride-on vehicle, includes a frame having a seat adapted to support a child, and a drive assembly with a battery-powered motor assembly. The ride-on vehicle further includes one or more steerable wheels and one or more driven wheels. In some embodiments, the ride-on vehicle includes a biasing assembly that is connected to the frame and adapted to bias the seat away from the vehicle's driven wheels. In some embodiments, the ride-on vehicle includes a free-floating wheel, which is unbiased and travels within a defined range of positions with respect to the ride-on vehicle's frame as external forces are imparted to the wheel. In some embodiments, the ride-on vehicle includes a high-speed switch positioned for momentary high-speed operation of the ride-on vehicle and a user-manipulable portion may be provided to enable a child to select such a high-speed configuration.

In some examples, children's ride-on vehicles may include a drive assembly. Drive assemblies for children's ride-on vehicles may include a motor assembly, a battery assembly, and an electrical circuit. The motor assembly may include at least one motor having a rotatable output shaft. The battery assembly may be configured to provide power to the motor assembly, and the battery assembly may include at least one battery. The electrical circuit may couple the battery assembly to the motor assembly. The electrical circuit may have a first configuration, in which the output shaft rotates at a first speed, and a second configuration, in which the output shaft rotates at a second speed. The electrical circuit may include a circuit-configuring switch and a speed-changing switch. The circuit-configuring switch may have a first operating state, in which the electrical circuit is configured in the first configuration, and a second operating state, in which the electrical circuit is configured in the second configuration. The speed-changing switch may be coupled to the circuit-configuring switch and operable for changing the operating state of the circuit-configuring switch.

In some examples, children's ride-on vehicles may include a body and a seat sized to receive a child; a plurality of wheels, which may include at least one driven wheel and at least one steerable wheel; a steering assembly, which may be coupled to the at least one steerable wheel; a motor assembly including at least one motor having a rotatable output shaft; a battery assembly configured to provide power to the motor assembly; and an electrical circuit coupling the motor assembly and the battery assembly. The at least one driven wheel may be operatively coupled to the output shaft, and the battery assembly may include at least one battery. The electrical circuit may include a circuit-configuring switch assembly and a speed-changing switch. The circuit-configuring switch assembly may include at least one circuit-configuring switch, which may have a first operating state, in which the circuit-configuring switch at least partially configures the electrical circuit such that the motor assembly rotates the output shaft at a first speed, and a second operating state, in which the circuit-configuring switch at least partially configures the electrical circuit such that the motor assembly rotates the output shaft at a second speed greater than the first speed. The circuit-configuring switch may include a biasing mechanism configured to bias the circuit-configuring switch toward the first operating state. The speed-changing switch may have a first speed-changing operating state, in which the speed-changing switch configures the circuit-configuring switch into the first operating state, and a second speed-changing operating state, in which the speed-changing switch configures the circuit-configuring switch into the second operating state.

In some examples, children's ride-on vehicles may include a body having a seat sized to receive a child; a plurality of wheels, which may include a driven wheel and a steerable wheel; a steering assembly, which may be coupled to the steerable wheel; a motor assembly, which may include a pair of motors, each of which may have a rotatable output shaft; a battery assembly configured to provide power to the motor assembly; and an electrical circuit coupling the motor assembly and the battery assembly. The battery assembly may include at least one battery. The driven wheel may be operatively coupled to the rotatable output shaft of at least one of the pair of motors. The electrical circuit may include a circuit-configuring switch assembly, a speed-changing switch, and a power switch. The circuit-configuring switch assembly may include at least one circuit-configuring switch, which may have a first operating state, in which the circuit-configuring switch at least partially configures the electrical circuit such that the pair of motors are connected in series, and a second operating state, in which the circuit-configuring switch at least partially configures the electrical circuit such that the pair of motors are connected in parallel. The circuit-configuring switch may include a relay and a biasing mechanism, which may be configured to bias the circuit-configuring switch toward the first operating state. The speed-changing switch may have a first speed-changing operating state, in which the speed-changing switch may configure the circuit-configuring switch into the first operating state, and a second speed-changing operating state, in which the speed-changing switch may be configured to deliver current to the relay to configure the circuit-configuring switch into the second operating state. The power switch may have a first power operating state, in which the electrical circuit is completed, and a second power operating state, in which the electrical circuit is not completed.

BRIEF DESCRIPTION OF THE DRAWINGS

FIG. 15 is an isometric view of a portion of the biased seat assembly for the children's ride on vehicle shown in FIG. 13.

FIG. 16 is a cross-sectional view of the portion of the biased seat assembly of FIG. 15 in an extended position.

FIG. 17 is a side elevation view of a children's ride-on vehicle, in which the biased seat assembly is in an extended position.

FIG. 18 is a cross-sectional view of the portion of the biased seat assembly of FIG. 15 in a compressed position.

FIG. 19 is a side elevation view of a children's ride-on vehicle, in which the biased seat assembly is in a compressed position.

FIG. 24 is an exploded isometric view of a wheel assembly.

FIG. 25 is a fragmentary cross-sectional view of the wheel assembly shown in FIG. 24.

FIG. 26 is a fragmentary cross-sectional view of another wheel assembly.

DETAILED DESCRIPTION

Figure 1:
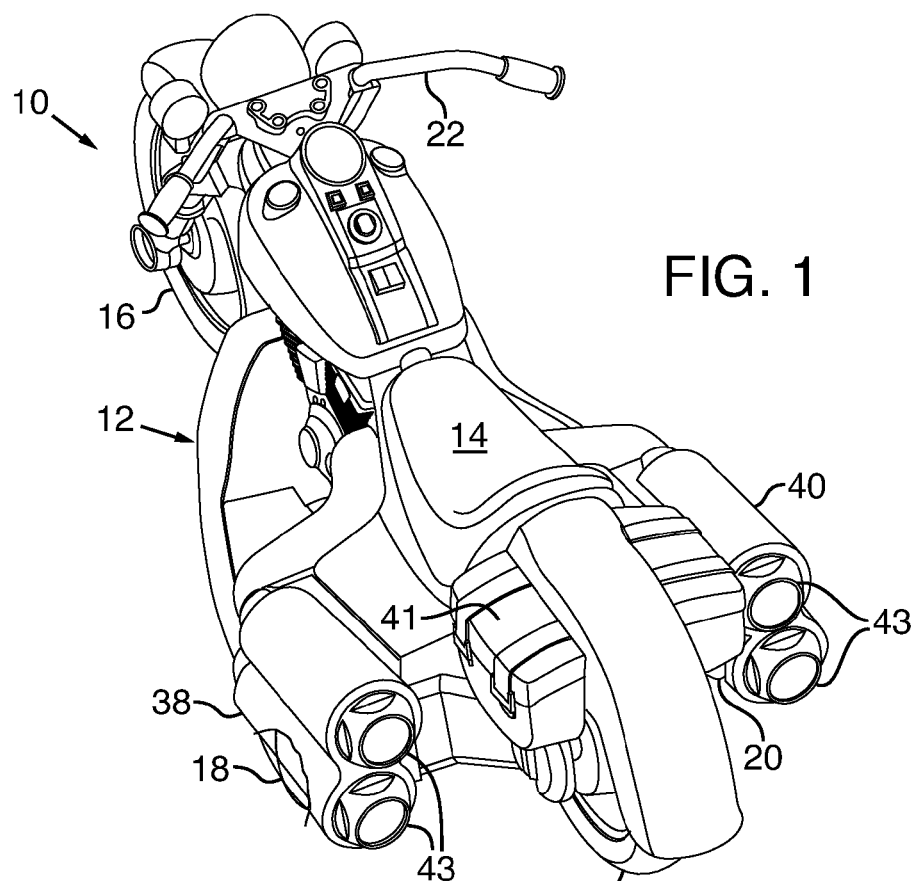
FIG. 1 is an isometric view of a children's ride-on vehicle, with a portion of the ride-on's frame broken away to expose a drive wheel.

A children's ride-on vehicle is shown in FIG. 1 and generally indicated at 10. Ride-on 10 includes a frame, or vehicle body, 12 with a seat 14, a forward wheel 16, drive wheels 18 and 20, a steering mechanism 22, and a rear wheel 24.

Figure 2:
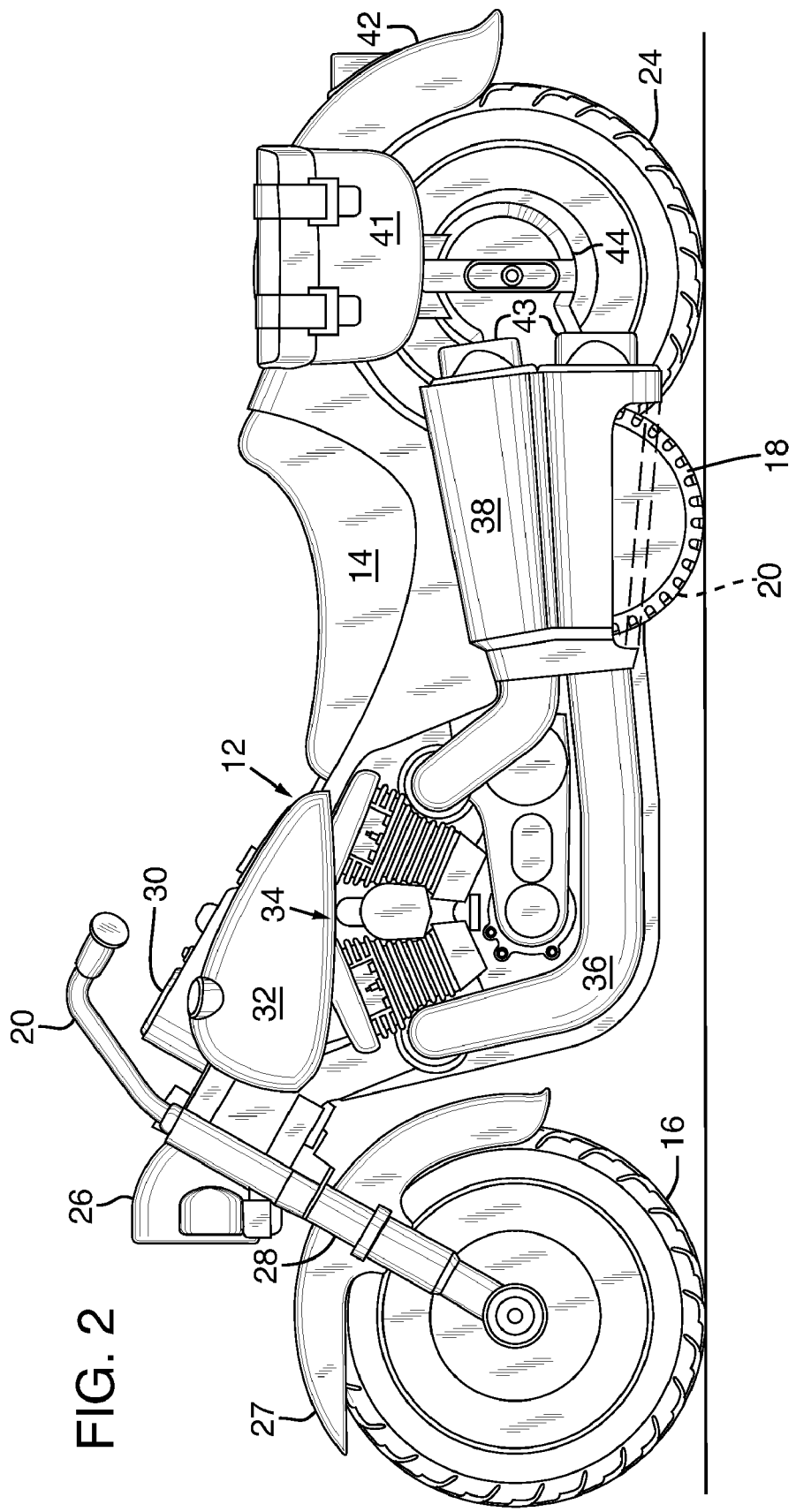
FIG. 2 is a side elevation view of the ride-on of FIG. 1.

As shown, ride-on 10 generally resembles a reduced-scale motorcycle, and more particularly a reduced-scale Harley-Davidson® motorcycle. It should be understood that ride-on 10 may be shaped to resemble other motorcycles and two-wheeled vehicles. Frame 12 typically is formed from molded plastic parts that are secured together by screws or other suitable fasteners. As shown in FIG. 2, frame 12 is shaped to resemble components of a conventional motorcycle, including a head light 26, front fender and struts 27 and 28, dash board 30, gas tank 32, engine 34, foot boards 36, exhaust pipes 38 and 40 (shown in FIG. 1), saddle bag 41, rear fender 42, tail lights 43 and swing arms 44 and 45 (shown in FIG. 5). Frame 12 also houses the vehicle's electrically powered motor assembly, battery assembly, and electrical and mechanical interconnections (not shown). It should be understood that the motor and battery assemblies each may include one or more motors or batteries, respectively. It should be understood that the shape and configuration of the frame will vary depending on the particular model and style of motorcycle that ride-on 10 is designed to resemble.

It is within the scope of the present disclosure that the ride-on may resemble other types of full-sized vehicles, such as cars, trucks, off-road vehicles, construction equipment, aircraft, seacraft and the like. Similarly, the ride-on may have a unique body shape or configuration that is designed to appeal to children and which does not necessarily resemble a reduced-scale version of a conventional full-sized vehicle.

In the embodiment of the ride-on shown in FIGS. 1 and 2, it can be seen that drive wheels 18 and 20 are substantially housed within the portions of frame 12 forming exhaust pipes 38 and 40. By "drive wheel" or "driven wheel" it is meant that the rotational output of the ride-on's motor assembly drives the rotation of the wheel about, or with, its axle or other mount. This is compared to a non-driven wheel, which rotates in the direction of movement of the ride-on, but is not directly coupled to the rotational output of the ride-on's motor assembly.

Because its drive (also referred to as driven) wheels are substantially hidden from view, ride-on 10 has the appearance of a two-wheeled motorcycle, even though it has at least three wheels supporting the frame in a stable operating position. In fact, in FIG. 1 it can be seen that a portion of the frame forming exhaust pipe 38 had to be broken away to reveal drive wheel 18. Similarly, drive wheel 20 is almost completely hidden from view by "exhaust pipe" 40. In FIG. 2, it can be seen that the lower portion of exhaust pipe 38 is removed to provide additional clearance for drive wheel 18. It is within the scope of the present disclosure that the exhaust pipes may have less of their lower portions removed, such as shown in dashed lines in FIG. 2. Furthermore, although a pair of driven wheels are shown in FIGS. 1 and 2, it is within the scope of the disclosure that more or less driven wheels may be used, either alone or in combination with one or more additional non-driven wheels.

Because ride-on vehicles are often used by young children who may not have the strength, size and/or coordination to balance a two-wheeled vehicle, ride-on 10 provides at least three spaced-apart supports that stabilize the ride-on. More specifically, front wheel 16 and drive wheels 18 and 20 form a tricycle. However, by hiding the drive wheels within the frame, ride-on 10 enables the child to feel and look like it is riding a two-wheeled motorcycle.

Figure 3:
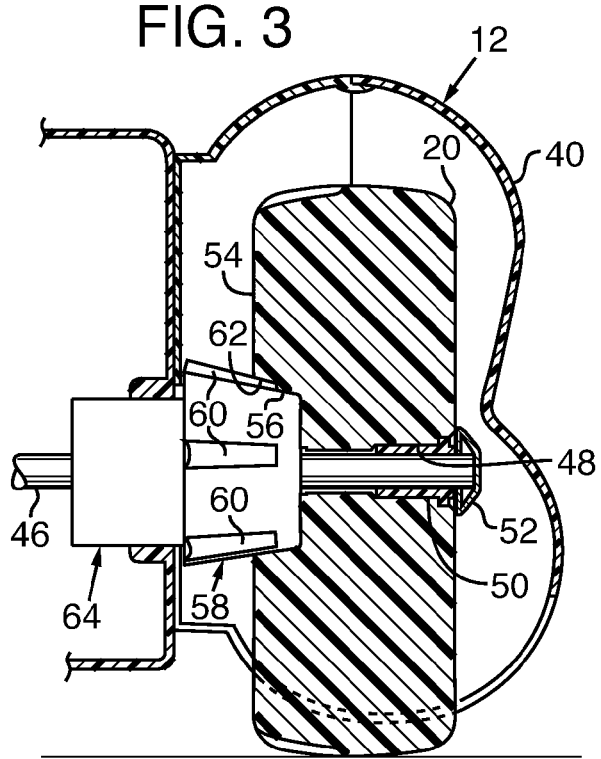
FIG. 3 is a cross-sectional view of one of the drive wheels shown in FIG. 1.
Figure 4:
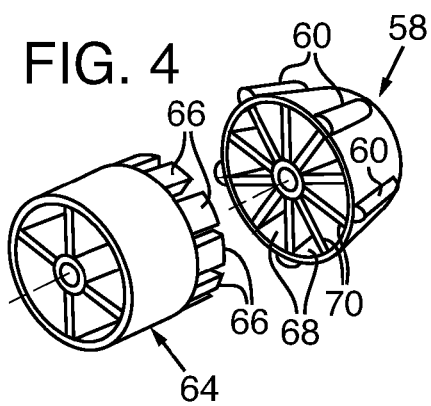
FIG. 4 is an exploded isometric view of the wheel bearing and gear shown in FIG. 3.

In FIG. 3, the interconnection between drive wheel 20 and the ride-on's motor assembly is shown. It should be understood that drive wheel 18 is coupled to the motor assembly with a similar set of interconnections. As shown, an axle 46 extends through wheel 20, which includes an outer recess 48 into which an axle bushing 50 is seated. Axle 46 passes through bushing 50, and wheel 20 is retained on the axle by a cap nut 52 or other suitable fastener. Wheel 20 includes an inner face 54 that includes a recess 56 within which a wheel bearing 58 is received. Bearing 58 is rotatably mounted on axle 46 and includes plural outer ribs 60 that extend radially outward from axle 46. Outer ribs 60 are received within corresponding channels 62 in recess 56. Once seated therein, wheel 20 rotates when bearing 58 is rotated about, or with, axle 46.

Wheel bearing 58 is rotated by a gear 64, which is driven by the ride-on's motor assembly (not shown) through any suitable mechanical interconnection, as is known in the art. Gear 64 is seated on axle 46 and includes plural teeth 66 that extend into cavities 68 formed by internal ribs 70 within bearing 58. Closing an electrical circuit between the ride-on's battery assembly and its motor assembly imparts an angular velocity to gear 64, which in turn directs the rotation of bearing 58 and drive wheel 20 by the engagement of teeth 66 and internal ribs 70. Because bearing 58 is interlocked with drive wheel 20, the rotation of bearing 58 also causes wheel 20 to rotate, thereby propelling the ride-on in the selected direction.

The circuit described above typically is opened and closed by a switch, which is mounted on the frame in a position where it may be operated by the child. Examples of suitable switches are pedals on one of the ride-on's foot boards 36, a throttle switch on steering mechanism (i.e. handle bars) 22, or a switch on dash board 30. The ride-on's controls may include a reversing switch 31 to enable the child to selectively change the direction of revolution of the above components, and thereby change the direction of travel of ride-on 10.

Unlike drive wheels 18 and 20, which are used to propel ride-on 10, or front wheel 16, which is oriented by steering mechanism 22 to steer the ride-on, rear wheel 24 just goes along for the ride. By this it is meant that wheel 24 is neither driven nor steerable. Instead, it is a free-spinning wheel that freely rotates and travels along a defined path as external forces are imparted upon it. By external forces, it is meant forces that originate from external ride-on 10 and which are imparted directly or indirectly to rear wheel 24. Examples of external forces are gravity and bumps or shocks causes by ride-on 10 traveling over uneven terrain. Wheel 24 may also be described as being free from internal vertical bias when within its defined range of positions because ride-on 10 does not include any spring, lever arm or other biasing mechanism to urge wheel 24 to a particular position. As such, wheel 24 is neither biased nor otherwise loaded to remain in a particular position or orientation with respect to the rest of ride-on 10. Wheel 24 may also be described as traveling or floating within a defined range of positions to adjust freely to changes in elevation in the surface over which ride-on 10 travels.

Figure 5:
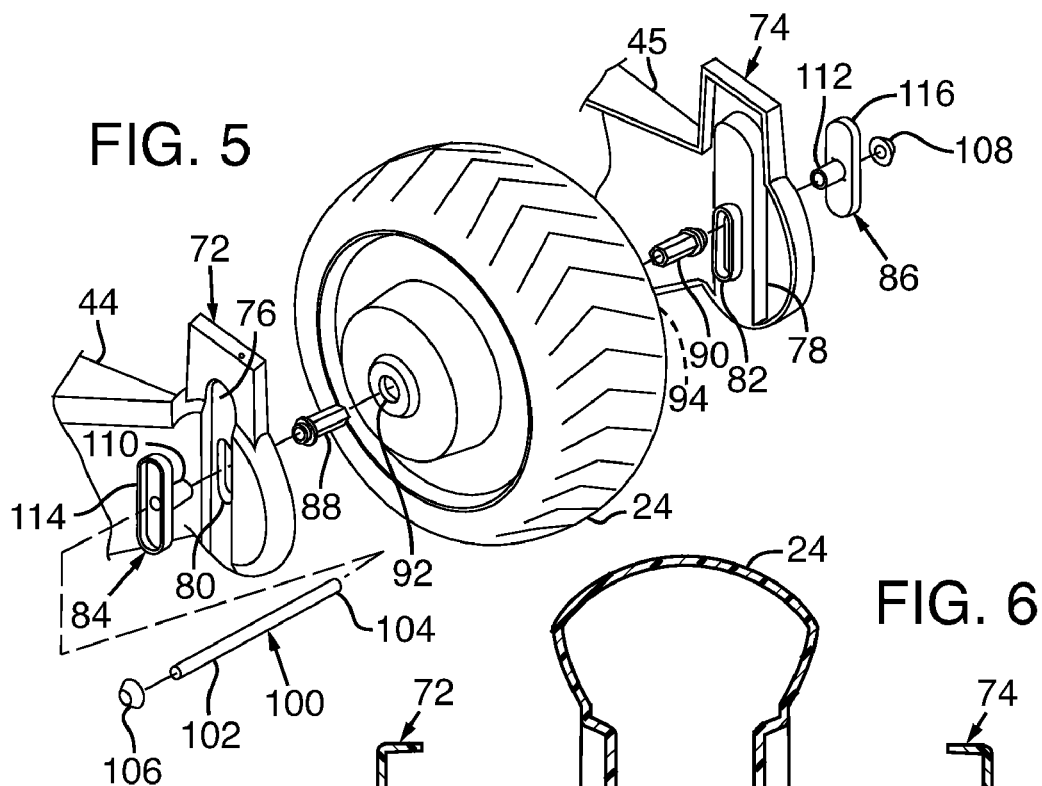
FIG. 5 is an exploded isometric view of the free-floating rear wheel shown in FIG. 4.
Figure 6:
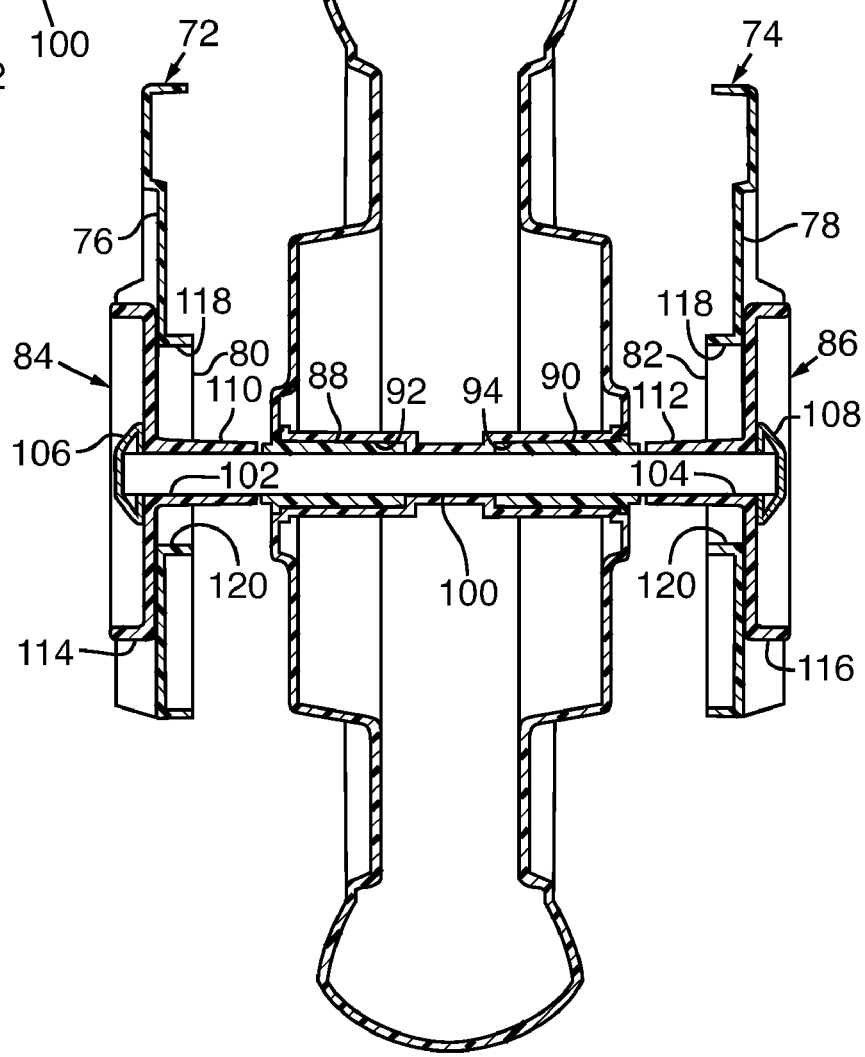
FIG. 6 is a cross-sectional view of the wheel of FIG. 5.

As shown in FIGS. 5 and 6, the portions of frame 12 which form the ride-on's "swing arms" 44 and 45 are in fact spaced-apart mounts 72 and 74 between which wheel 24 is rotatably mounted. Mounts 72 and 74 are fixed in place relative to the rest of frame 12, and includes regions 76 and 78 that form a track with vertical channels 80 and 82. As discussed subsequently, channels 80 and 82 cooperate with axle bearings 84 and 86 to define a race or vertical range through which wheel 24 may travel as external forces are applied to the wheel.

As perhaps best seen in FIG. 5, wheel 24 includes a pair of bushings 88 and 90 that are inserted into a corresponding pair of receptacles 92 and 94, one on each side of wheel 24. As shown, the portions of bushings 88 and 90 which are inserted within the receptacles are generally hex-shaped. Receptacles 92 and 94 have a similar shape, thereby enabling wheel 24 to rotate as bushings 88 and 90 rotate. It should be understood that configurations other than the hex-shaped configuration shown in FIG. 5 may be used.

An axle 100 passes through wheel 24 and bushings 88 and 90 to provide an axis about which wheel 24 may rotate. Axle 100 includes a pair of ends 102 and 104, which each are passed through a respective one of channels 80 and 82 and axle bearings 84 and 86. A pair of cap nuts or other suitable fasteners 106 and 108 are mounted on the ends of axle 100. Fasteners 106 and 108 secure the axle bearings, mounts, and wheel together with only a small amount of side-to-side play, while still allowing bushings 88 and 90, and thus wheel 24, to rotate on the axle.

As discussed, channels 80 and 82 define a vertical range of positions within which axle bearings 84 and 86 are free to travel. As shown, channels 80 and 82 each have an oval, or racetrack-shaped opening, through which a stem portion 110 and 112 of one of the axle bearings extends. While the stem portions extend through the bearings, the head portions 114 and 116 of each axle bearing slide up and down the track defined by regions 76 and 78. Movement of axle bearings 84 and 86 up and down in response to uneven terrain is limited by top 118 and bottom 120 limits of channels 80 and 82, which are indicated in FIG. 6.

From a nominal position on level terrain, wheel 24 can move up approximately 0.4 inches and down approximately one inch. By varying the length of the channels or size of the axle bearings, it is possible to define a range of positions which is larger or smaller than this range. For most ride-ons, it is expected that a range of between approximately one inch and approximately three inches will be sufficient. It should be understood, however, that the most suitable range of positions will tend to vary depending upon such factors as the size of the ride-on, the surface upon which it is intended for use, and the distance between the ride-on's drive wheels and free-floating wheel. Therefore ranges outside of those recited above are possible and within the scope of the present disclosure.

Figure 7:
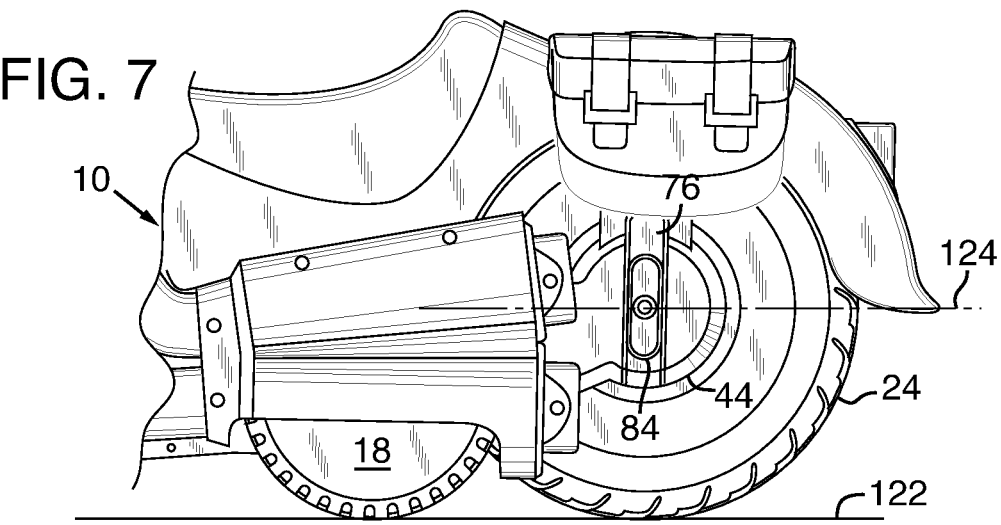
FIG. 7 is a fragmentary side elevation view of the rear portion of the ride-on of FIG. 4 on a straight surface.

In FIG. 7, ride-on 10 is shown traveling over a straight surface 122. By this it is meant that the surface on which ride-on 10 travels is planar. As shown, surface 122 is level, however it could also be inclined at an angle. In FIG. 7 it can be seen that each of the ride-on's wheels are in contact with surface 122. The position of rear wheel 24 shown in FIG. 7 will be referred to herein as a neutral or intermediate position, since wheel 24 can travel upward and downward from this position, as discussed below. In FIG. 7, the position of axle 100 is generally indicated with a line 124 extending generally parallel to surface 122. Because wheel 24 is mounted to frame 12 so that it may freely spin and travel up and down as external forces are imparted to the wheel, the frictional contact with surface 122 causes the wheel to rotate as ride-on 10 travels over surface 122. This causes wheel 24 to rotate in a direction and with a speed that corresponds with the speed and direction of ride-on 10. This also makes wheel 24 appear to be a driven wheel, although in reality it is a free-floating wheel.

Figure 8:
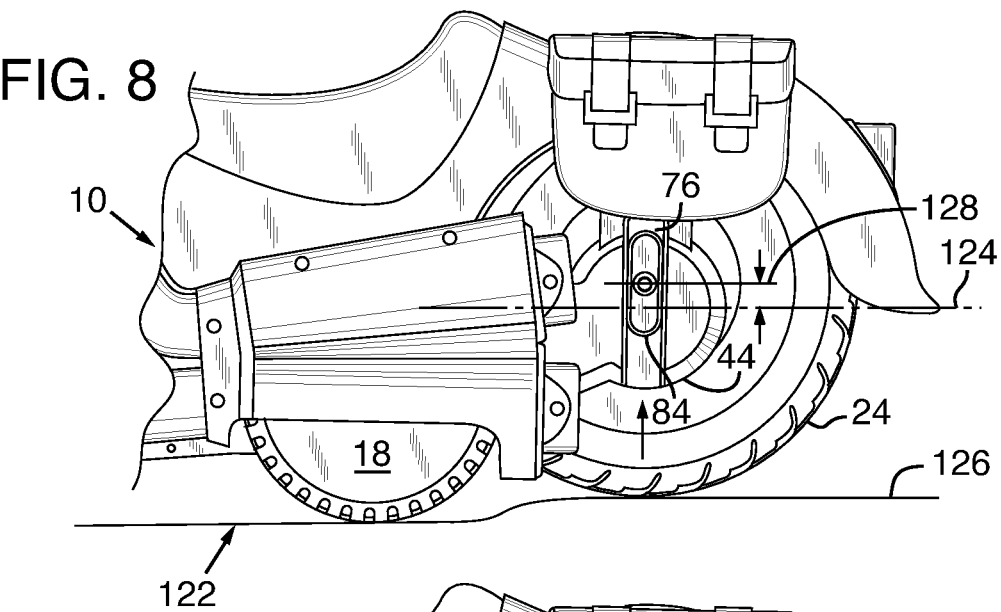
FIG. 8 is the side elevation view of FIG. 7, with the rear wheel raised from the position of FIG. 7 to accommodate travel over an uneven surface.

In FIG. 8, surface 122 is uneven. Specifically, the portion 126 of surface 122 over which wheel 24 is positioned is higher than the portions of the surface over which the ride-on's front and drive wheels 16, 18 and 20 are positioned. Because wheel 24 is not secured or biased to remain in its neutral position, the axle bearings have raised upwardly in their respective regions of the track, thereby also raising rear wheel 24 from its position shown in FIG. 7. For comparison with the position shown in FIG. 7, the position of axle 100 in this elevated position is generally indicated with line 128, and the extent to which wheel 24 has been raised can be seen by the distance between lines 124 and 128.

Because wheel 24 is a free-floating wheel and not a fixed wheel, it may deflect away from its current position when it encounters an external force, such as when ride-on 10 encounters the bump between the uneven portions of surface 122. This enables drive wheels 18 and 20 to remain in contact with surface 122. It should be understood by looking at FIG. 8 that if rear wheel 24 was not a free-floating wheel, the differences in elevation between front and rear wheels 16 and 24 would have resulted in drive wheels 18 and 20 being suspended above surface 122. Since these wheels are the ride-on's drive wheels, the vehicle would not be able to continue along its path until the user or other person freed the ride-on from its stuck position.

Figure 9:
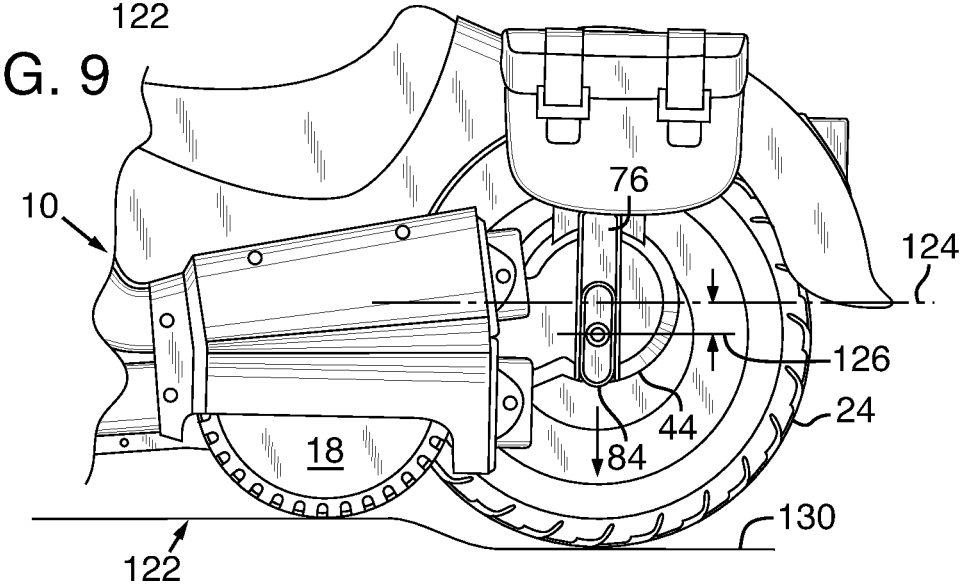
FIG. 9 is the side elevation view of FIG. 7, with the rear wheel lowered from the position of FIG. 7 to accommodate travel over another uneven surface.

On the other hand, if the portion of surface 122 is at a lower elevation than the corresponding portions of the surface over which the ride-on's front wheel travels, then the vehicle also could become stuck if wheel 24 was not a free-floating wheel. Alternatively, rear wheel 24 could be suspended above the surface. For example, in FIG. 9, surface 122 includes a depression 130 over which wheel 24 is positioned. Once suspended above this portion of the surface, the illusion of ride-on 10 being an actual two-wheeled motorcycle would be lost because the rear wheel would be elevated above the surface. However, by allowing rear wheel 24 to float within region 76 of the track, the wheel travels downward in the track to remain in contact with the surface. The position of axle 100 in FIG. 9 is indicated with a line 130, and the relative distance between this position and the position shown in FIG. 7 is shown between lines 126 and 130.

Besides the advantage of preventing the ride-on from becoming wedged or stuck in a position if the drive wheels lose contact with the surface over which the ride-on is traveling, free-floating rear wheel 24 also results in the ride-on looking more like an actual two-wheeled motorcycle because the wheel remains in contact with the ground surface at all times. This frictional contact with the surface causes the wheel to rotate about its axle, much like an actual non-driven wheel of a vehicle. Therefore, wheel 24 will spin in the direction of movement of ride-on 10 and will spin faster or slower as the speed of ride-on 10 is increased or decreased. Furthermore, because mounts 72 and 74 are configured to resemble the swing arm of an actual motorcycle, upward and downward movement of axle bearings 84 and 86 and wheel 24 as ride-on 10 travels over uneven terrain closely resembles the visual appearance of an actual motorcycle traveling over uneven terrain.

Figure 10:
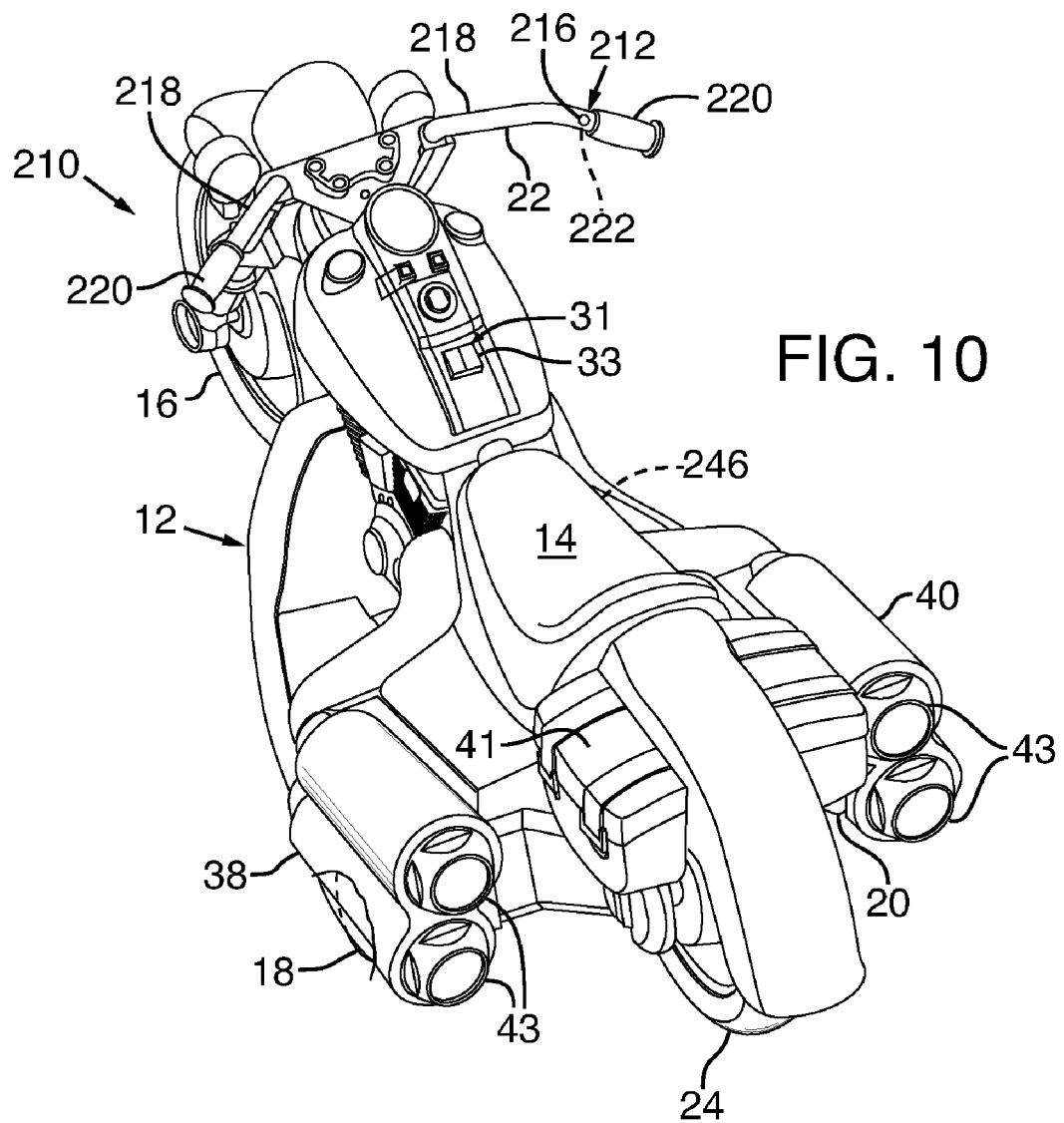
FIG. 10 is an isometric view of another children's ride-on vehicle.

Another embodiment of a ride-on vehicle is shown in FIG. 10 at 210. Similar to the previously described ride-ons, ride-on 210 generally resembles a motorcycle. Unless otherwise specified, the elements, subelements and possible variations discussed above may be included with ride-on 210. In FIG. 10, it can be seen that the ride-on includes a frame, or vehicle body, 12 with a seat 14 upon which a child operating the ride-on sits, a steering mechanism 22, and a plurality of wheels 16, 18, 20 and 24. Ride-on 210 may be formed with or without free-floating wheel 24, and with driven wheels 18 and 20 with configurations other than housed within exhaust pipes 38 and 40.

In FIG. 10, the ride-on includes a switch assembly 212 having a switch (shown in FIG. 11 at 214) and a user-manipulable portion 216 on the steering mechanism 22 of the ride-on. As shown, steering mechanism 22 takes the form of a handlebar assembly in the form of a pair of handlebars 218 having regions 220 adapted to receive the child's hands while the ride-on is being operated. Regions 220 may also be referred to as handgrips because these regions are adapted to be grasped by the child operating the ride-on to steer the ride-on. It should be understood that the handlebar assembly may include a single handlebar with a pair of handgrips, as opposed to the pair of handlebars shown in FIG. 10.

Preferably, user-manipulable portion 216 is positioned for actuation by a child without requiring the child's hands to be removed from regions 220. For example, portion 216 may be mounted on the handlebar assembly or other suitable steering mechanism at least proximate the handgrips so that the child's hands do not need to be removed from the handgrips to actuate portion 216. By "at least proximate" it is meant that portion 216 is on, adjacent, or otherwise positioned sufficiently near handgrips 220 so the child's hands can remain on the handgrips, steering wheel, or other suitable structure used to steer and control the direction of the ride-on, without a loss of control when the child selects high-speed operation of the ride-on by pressing or otherwise actuating portion 216.

Switch assembly 212 selectively configures the ride-on's drive assembly for high-speed operation. Switch 214 and corresponding portion 216 may take any suitable form, such as toggle switches, rotatable members, momentary switches, rocker switches, push-buttons, etc. In some embodiments, switch assembly 212 is configured to require constant pressure from the child to remain in the high-speed configuration. For example, the switch assembly may include a biasing mechanism, such as a spring 222, that biases the switch assembly to return to the low-speed configuration when portion 216 is released by the child. This prevents the ride-on from being inadvertently operated in the high-speed configuration. In such a configuration, switch assembly 212 may be thought of as providing a "turbo switch" that a child operating the ride-on may use to provide a "boost" of power. More particularly, when the ride-on is configured to be driven in a forward direction and the child presses portion 216, the ride-on will now travel at a higher speed than before the button was pressed.

Figure 11:
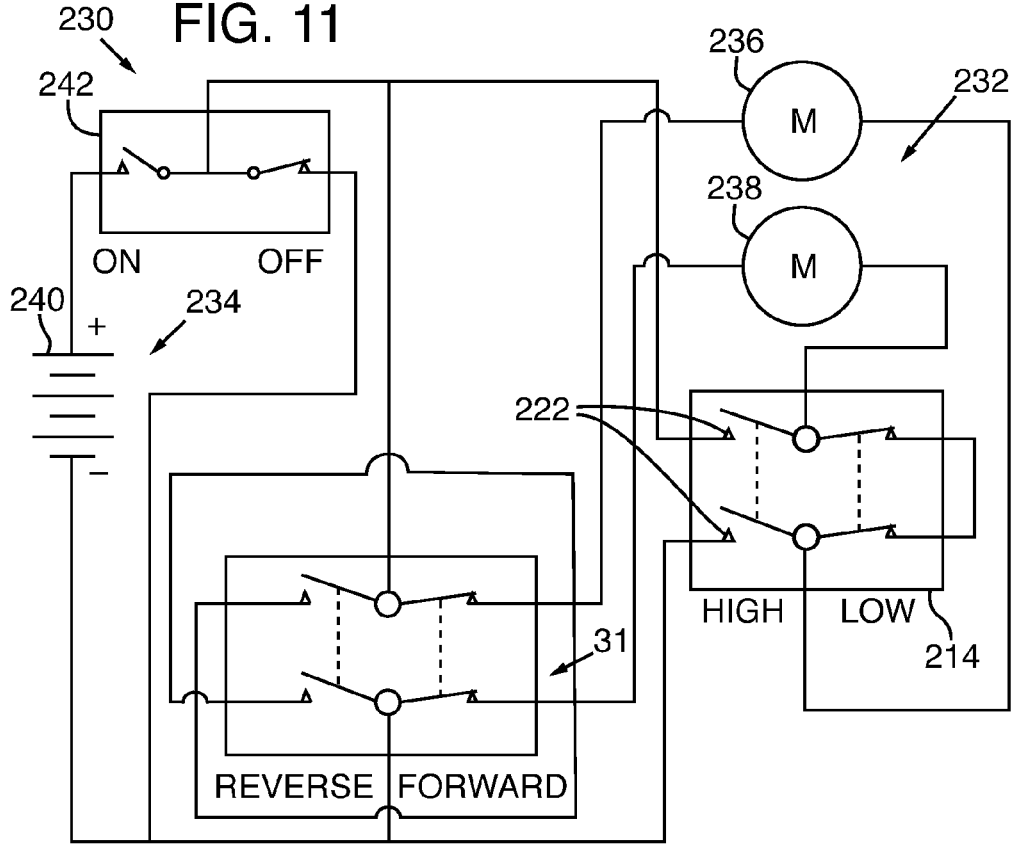
FIG. 11 is a schematic wiring diagram for a children's ride-on vehicle.

An example of a suitable wiring diagram for ride-on 210 is shown in FIG. 11. Similar to the previously discussed ride-ons, ride-on 210 includes a drive assembly 230 that includes a motor assembly 232 and a battery assembly 234. The motor assembly includes one or more motors, and the battery assembly includes one or more batteries. For example, in FIG. 11 the drive assembly is shown including a pair of motors 236 and 238 powered by a single battery 240. It should be understood that the drive assemblies for the ride-ons discussed herein may include two motors powered by a single battery or a pair of batteries, or alternatively, may include a single motor powered by one or more batteries.

Although not required, an advantage of having more than one motor, more than one battery, or both, is that the speeds of operation of the ride-on may be varied by selectively connecting the motors or batteries between parallel and series configurations. For example, a pair of six-volt batteries will deliver six volts to a motor assembly if connected in parallel, and 12 volts if connected in series. Similarly, a battery assembly adapted to deliver 12 volts to a motor assembly that includes a pair of motors will deliver 12 volts to each motor if the motors are connected in parallel, and 6 volts to each motor if the motors are connected in series.

Also shown in FIG. 11 are switches 31, 214 and 242. Switch 31 is a reversing switch that includes a user-manipulable portion 33 (shown in FIG. 10) that enables a user to selectively change the direction the ride-on travels by reversing the polarity of the current from the battery assembly to the motor assembly. Switch 214, discussed above, is a "turbo" switch that selectively causes high-speed operation of the ride-on. Switch 242 is an on/off switch that includes a user-manipulable portion 246 that is selectively actuated by the user to complete the electrical circuit between the ride-on's motor and battery assemblies, thereby causing driven operation of the ride-on. An illustrative example of a suitable portion 246 is a foot pedal on one of the ride-on's running boards, such as shown in FIG. 10. A suitable foot pedal is disclosed in U.S. Pat. No. 5,319,996, which is hereby incorporated by reference. Other examples include a rotary grip on the ride-on's handlebars and a pushbutton, shiftable lever or the like on the ride-on's dashboard. In FIG. 11, switches 31 and 214 are shown as double-pole double-throw switches, although any suitable switch mechanism may be used. In FIG. 11, switches 214 and 242 are shown as momentary switches that are respectively biased, such as with springs, to the low-speed and off configurations.

In the diagram shown in FIG. 11, it can be seen that the drive assembly does not permit high-speed operation of the ride-on in the reverse direction. This safety feature prevents the child from being able to drive the vehicle in reverse at high speeds. In the diagram shown, power is no longer delivered to the motor assembly if high-speed, reverse operation is selected. Alternatively, the wiring harness may be configured to produce low-speed reverse operation regardless of whether high- or low-speed reverse operation is selected by the child. An example of another suitable switch assembly adapted to preclude high-speed operation of the ride-on in a reverse direction is disclosed in U.S. Pat. No. 5,644,114, which is hereby incorporated by reference.

It should be understood that the wiring diagram shown in FIG. 11 is for the purpose of illustration and that other suitable wiring diagrams, or wiring harnesses, may be used. For example, reversing switch 31 may be omitted to produce a ride-on that is driven by motor assembly 232 in one direction only. As another example, omission of speed switch 212 results in a ride-on that is driven at a single speed by motor assembly 232.

It should be understood that the above-described "turbo switch" may be used on ride-ons having configurations other than the illustrative embodiment shown in FIG. 10. For example, it may be used on battery-powered ride-ons that resemble other forms of full-sized vehicles, such as cars, trucks, off-road vehicles, aircraft, and the like, as well as battery-powered ride-ons that have unique shapes and designs. Furthermore, switch assembly 212 may be used with other types of steering mechanisms, such as steering wheels, a single handlebar, and steering levers.

Figure 12:
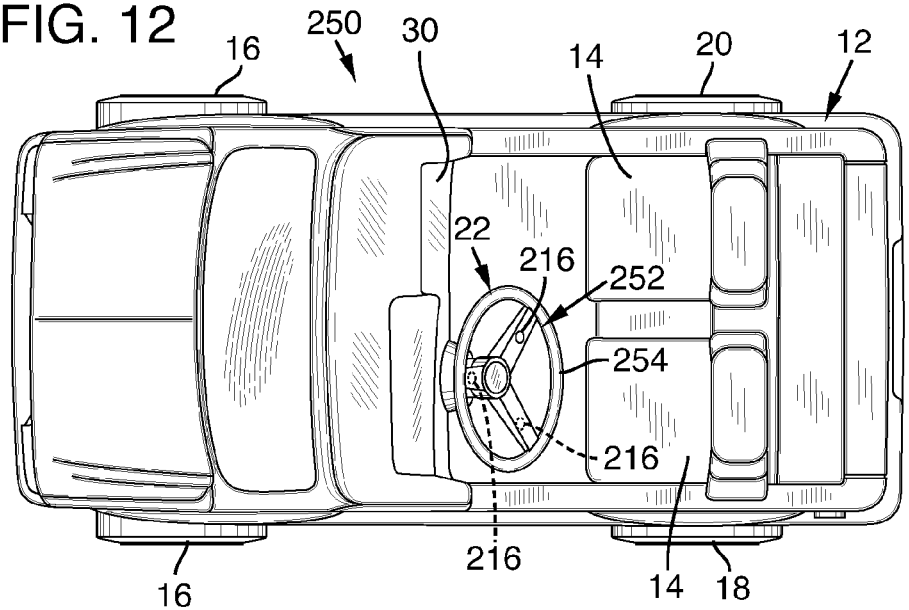
FIG. 12 is a top plan view showing another embodiment of a children's ride-on vehicle.

For example, in FIG. 12 a ride-on is shown at 250 that includes a steering mechanism 22 in the form of a steering wheel 252. It should be understood that ride-on 250 includes any of the drive assemblies described above with respect to ride-on 210. As shown, wheel 252 includes user-manipulable portion 216 of "turbo" switch assembly 212 positioned for engagement by a child holding steering wheel 252 having user-grippable portion 254. Additional user-manipulable portions 216 are shown in dashed lines in FIG. 12 to indicate that the ride-on may include more than one user-manipulable portion 216, such as to enable a wider range of positions in which the child may grasp steering mechanism 22 and actuate at least one of the user-manipulable portions without removing the child's hands from the steering mechanism.

Figure 13:
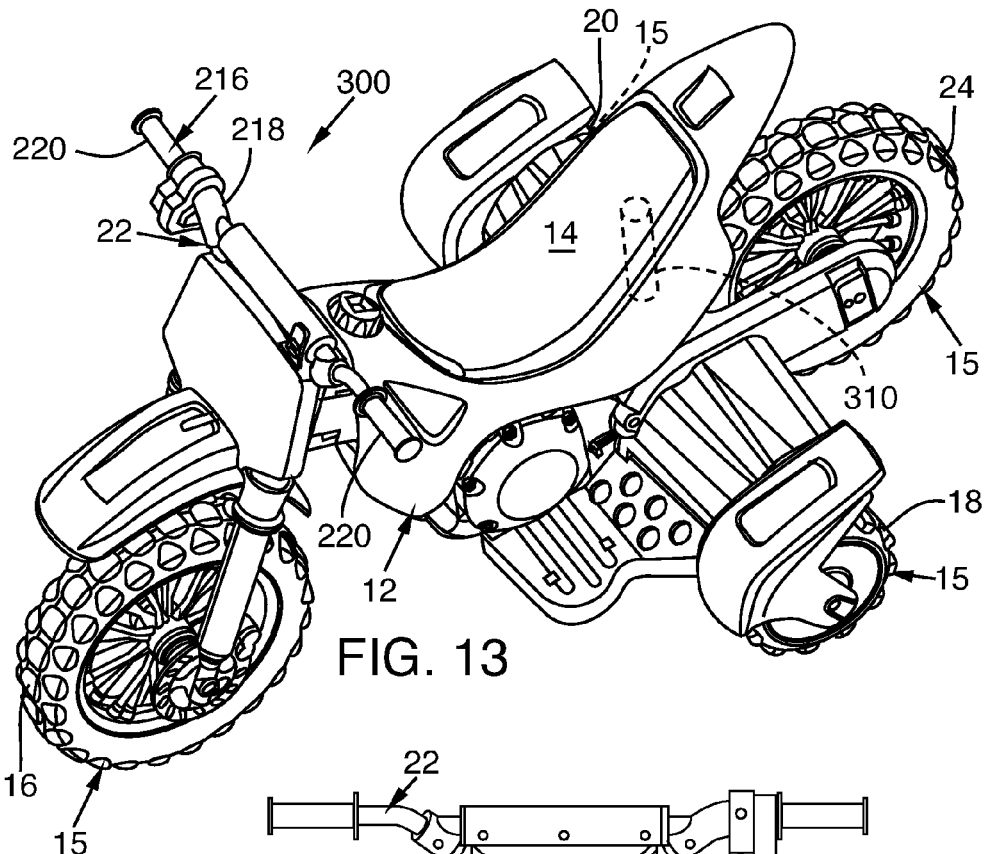
FIG. 13 is an isometric view of another children's ride-on vehicle.
Figure 14:
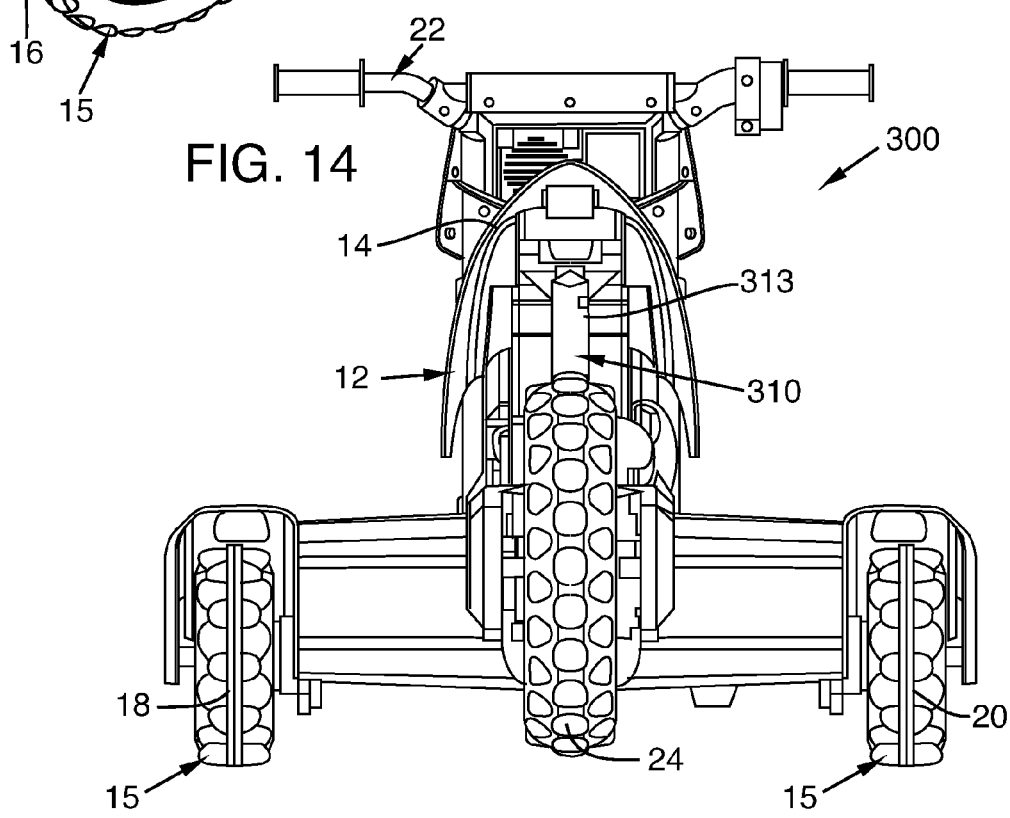
FIG. 14 is a rear elevation view of the children's ride-on vehicle shown in FIG. 13.

Another children's ride-on vehicle is shown at 300 in FIGS. 13 and 14. Any combination of the above-described elements, sub-elements and components may be included on ride-on 300. Furthermore, like reference characters refer to corresponding elements shown on the previously described ride-on vehicles and are not intended to limit the scope of the disclosure. Thus, as shown in FIGS. 13 and 14, ride-on vehicle 300 includes a frame or body 12, a seat 14, a plurality of wheels 15, and a steering mechanism 22.

Children's ride-on vehicle 300 is sized for operation by a child. As shown, vehicle 300 generally takes the form of a motorcycle, and more particularly a dirt bike. However, as with the above described embodiments, it is within the scope of the disclosure that vehicle 300 may resemble a reduced-scale or scaled-down version of any other type of vehicle, including, but not limited to, a car, a truck, a farm vehicle, an off-road vehicle, a construction vehicle, an airplane, a boat, etc. Alternatively, vehicle 300 may take the form of a child-sized fantasy vehicle that does not have a full- or adult-sized counterpart. Vehicle 300 may also include any number of the features that simulate features typically found on adult-sized vehicles, including, but not limited to, storage compartments, saddlebags, fenders, shocks, struts, foot boards, dashboards, gauges, exhaust pipes, gas tanks, side doors, trunks, hoods, headlights, taillights, windshields and license plates. The particular features are not essential and may vary without departing from the scope of the disclosure.

Wheels are rotatably coupled to frame 12 and permit vehicle 300 to travel across a ground surface. For example, and as shown in FIGS. 13 and 14, vehicle 300 includes a single front wheel 16, two rear driven wheels 18, 20 and a free-floating wheel 24. As previously described, having at least three load-bearing wheels (16, 18 and 20) provides increased stability to vehicle 300 compared to a two-wheeled vehicle, which may be difficult for some children to balance and stabilize. As shown, two of the load-bearing wheels (18 and 20) are at least partially enclosed, or housed, within the vehicle's frame to simulate the appearance of a two-wheeled vehicle. However, other configurations are possible, and the number and size of the wheels may vary without departing from the scope of the disclosure. For example, vehicle 300 may be formed without a free-floating wheel, with more than one steerable wheel, and/or with at least one steerable wheel that is also a drive, or driven, wheel. Additionally, although wheels 18 and 20 are illustrated as the driven wheels, it is within the scope of the disclosure that any combination of the vehicle's wheels may function as the driven wheels.

Vehicle 300 further includes a seat assembly 310 that includes a seat 14, which is adapted and sized to receive at least one child. Thus, seat 14 is generally sized and positioned to enable a child seated on seat 14 to operate vehicle 300. For example, a child seated on seat 14 should be able to easily access steering mechanism 22. Additionally, seat 14 may be adjustable to enable children of different sizes to access steering mechanism 22 and operate vehicle 300.

Seat assembly 310 may be referred to as a biased seat assembly because it includes a biasing assembly 313 that extends generally between seat 14 and frame 12. As shown best in FIG. 14, biasing assembly 313 simulates a shock absorber. More specifically, biasing assembly 313 regulates the movement of seat 14 relative to frame 12, such that seat 14 and a child rider may oscillate up and down, relative to frame 12, to mimic, or simulate, the motion produced by shock absorbers on a full-sized dirt bike. Described another way, the seat assembly 310 is coupled for pivotal movement relative to the frame of the vehicle from a pivot point forward of seat 14, and the biasing assembly regulates the pivotal, oscillating movement of the seat relative to the body. Unlike the shock absorbers on a full-sized dirt bike, which extend between the frame and the vehicle's wheels, assembly 313 extends between the seat and frame of the vehicle to simulate the look and feel of actual shock absorbers without actually dampening the transmission of forces from the vehicle's wheels to its frame. Biased seat assembly 310 may also accommodate a child bouncing up and down on seat 14, even when the vehicle is at a stop or traveling over a smooth surface.

Biasing assembly 313 may be attached to frame 12 and seat 14 via any suitable conventional fastening mechanism 311. An example of a suitable fastening mechanism 311 is shown in FIG. 15. As shown, biasing assembly 313 includes a fastening mechanism in the form of an anchor 312 that is adapted to receive a fastener, such as a pin or bolt, through which seat 14 may be attached. Similarly, biasing assembly 313 includes a second anchor 314 that is adapted to receive a fastener through which assembly 313 may be coupled with frame 12. As another example, the vehicle's seat and frame may include anchors 312 and 314, with assembly 313 being coupled thereto by pins or other fasteners, or by mounts on the ends of assembly 313. As still another example, the subsequently described telescoping portions of the assembly may be integrally formed with, or otherwise permanently secured to, the corresponding seat or frame of vehicle 300.

Assembly 313 includes an external casing 316, or housing, which as shown in FIG. 15 resembles a conventional shock absorber, thereby further simulating the appearance of a conventional dirt bike or motorcycle. It is within the scope of the disclosure that casing 316 may have other configurations. As shown, assembly 313 includes at least one pair of telescoping members 318 and 320 that extend generally between seat 14 and frame 12. At least one of the telescoping members is adapted to receive the other telescoping member so that the members may telescope (i.e. slide) relative to each other to allow the length of assembly 313 to vary. For example, and as illustrated in FIG. 15, upper telescoping member 318 has a diameter larger than the lower telescoping member 320, and thus is configured to receive lower telescoping member 320. Alternatively, it is within the scope of the disclosure that lower telescoping member 320 have a diameter that exceeds upper telescoping member 318 such that lower telescoping member 320 is configured to receive upper telescoping member 318.

A biasing mechanism or biasing structure 322 is contained within casing 316 and urges the members axially away from each other to the subsequently described extended position of the biased seat assembly. Thus, as illustrated in FIG. 16, an upper telescoping member or first tube 318 may be a hollow cylinder that is adapted to contain a biasing mechanism, such as a spring 322. Although a coil spring is illustrated, biasing mechanism 322 may additionally, or alternatively, include other resilient members that are adapted to urge the seat and frame away from each other. Additionally, it is within the scope of the disclosure that biasing mechanism 322 be contained within lower telescoping member or second tube 320, and/or partially contained within either or both of upper tube 318 and lower tube 320. The strength of biasing mechanism 322 may vary within the scope of the disclosure, such as depending upon such factors as the desired "bounce" (amplitude and frequency at which the biasing mechanism urges the seat away from frame 12) of the biased seat assembly, the weight to be supported by seat 14, whether the seat assembly is designed to "bottom out" (i.e. have a compressed configuration in which the telescoping members are limited from telescoping together any further by the casing or other structural portion(s) of assembly 313 instead of by biasing mechanism 322), etc.

The operation of biased seat assembly 310 may be better understood upon reference to FIGS. 16-19. Biased seat assembly 310, as shown in FIG. 16 and discussed above, includes a first tube 318 with spring 322 disposed within tube 318. Spring 322 operates to space first tube 318 from second tube 320. Thus, when no pressure or force is applied to either seat 14 or frame 12, spring 322 maintains seat 14 away from frame 12. An example of such a configuration is shown in FIGS. 16 and 17, in which spring 322 is in an expanded position (where there is no external compressive force acting on spring 322) and thus, tubes 318 and 320 are respectively spaced apart. More particularly, and as shown in FIG. 17, when no compressive force is applied to spring 322 by a child sitting on seat 14, the rear of seat 14 is spaced apart, as generally indicated at 324, from frame 12 and wheel 24. The distance that seat 14 extends away from frame 12 may be dictated by the type of spring used and the arrangement of tubes 318 and 320.

Upon application of a compressive force that urges the seat and frame together, either upon seat 14 or upon frame 12, spring 322 is compressed. For example, spring 322 may be compressed by either seat 14 being pushed downward, such as when a child sits on seat 14, and/or by frame 12 being pushed upward, such as when the vehicle is driven over an uneven surface. As illustrated in FIG. 18, this force results in tube 320 telescoping into tube 318. More specifically, tube 320 slides along the inside of tube 322 compressing spring 322 against an upper internal surface 326 within tube 318. The amount of compression of spring 322 may vary and may be dependent on the amount of force applied to spring 322 and to the type of spring used. FIG. 19 illustrates an example of the effect of the compression of spring 322 on the position of seat 14 relative to frame 12. Specifically, seat 14 has been depressed towards frame 12 and wheel 24 when a force, such as force 328, is applied to biased seat assembly 310. The distance of depression 330 depends on the amount of compression of spring 322.

Similar to the previously described embodiments, vehicle 300 may include a drive assembly having a motor assembly 232 that is adapted to drive the rotation of the vehicle's driven wheels and which is powered by a battery assembly 234. As discussed, motor assembly 232 may include one or more motors, battery assembly 234 may include one or more batteries. Similarly, motor assembly 232 includes an output that is coupled to the drive wheels so that rotation of the output causes a corresponding rotation of the drive wheels, either directly or via a linkage mechanism, such as one or more gears, a belt-and-pulley assembly, etc.

When vehicle 300 is a motorized ride-on vehicle, it may have a variety of power configurations, including one or more of a single-forward speed, a single-reverse speed, at least two predetermined forward speeds, at least two predetermined reverse speeds, and/or a user-selected forward or reverse speed. As used herein, "speed" refers to the relative amount of power delivered to the vehicle's motor assembly. It should be understood that this may correspond to a variable actual speed, such as depending upon the weight of the child rider, the terrain upon which the vehicle is being driven, etc.

Figure 20:
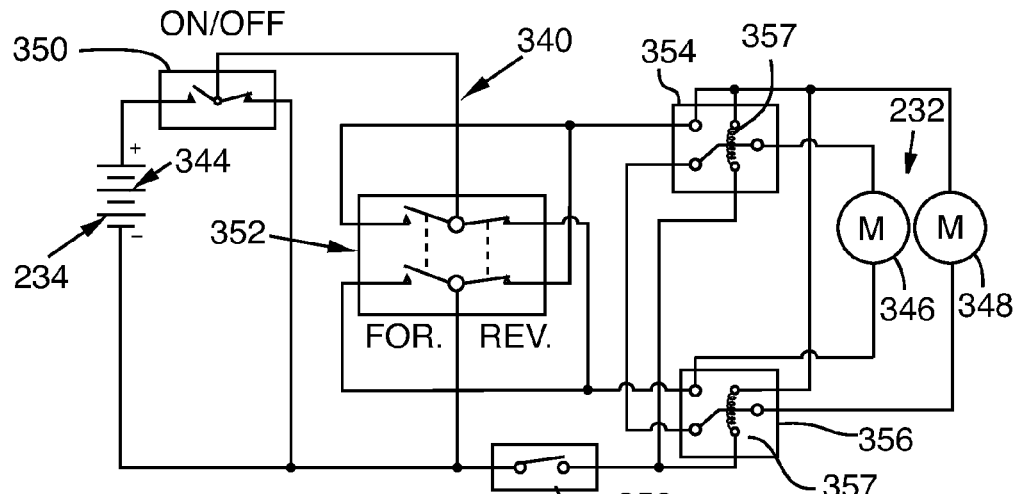
FIG. 20 is a schematic wiring diagram for another children's ride-on vehicle.

In FIG. 11, an example of a wiring configuration, or wiring harness, for a motorized vehicle having high- and low-speed forward configurations and a single (low) speed reverse configuration was shown and described. In FIG. 20, another example of a suitable wiring harness or wiring configuration for the vehicle's drive assembly is shown and includes a switch assembly 340 through which user-inputs are received to selectively configure the drive assembly between its driving configurations. To illustrate that the number of motors and batteries in the motor and battery assemblies may vary, battery assembly 234 is illustrated in FIG. 20 as including a single battery 344, and motor assembly 232 is illustrated as including a pair of motors 346 and 348. However, the number of each of the components may vary from a single component, to more than two components.

As also shown in FIG. 20, the switch assembly may include a plurality of switches that selectively receive user-inputs and configure the drive assembly between reverse, low-speed forward, and high-speed forward configurations. The switches may include a corresponding user-manipulable portion that is adapted to receive user-inputs. Examples of user-manipulable portions include buttons, levers, slides, shift mechanisms, foot pedals, and the like, as shown in the previously described drawings. In FIG. 20, many of the switches in assembly 340 have been illustrated as various combinations of single- and double-throw and single- and double-pole switches; however, variations to this construction are within the scope of the disclosure. Similarly, it may be desirable for some of the switches, such as the on/off switch, turbo switch and/or reverse switch to be momentary switches that are biased to a particular configuration (such as off, low, and forward). However, it is within the scope of the disclosure that any combination from no momentary switches, to all momentary switches, may be used.

As schematically illustrated in FIG. 20, switch assembly 340 includes a power, or on/off, switch 350, which upon receipt of a user-input causes motor assembly 232 to be powered by battery assembly 234. Thus, when a child rider depresses, or otherwise actuates, switch 350, an electrical circuit is completed, thereby providing power to motor assembly 232 and enabling the driving operation of vehicle 410. To enable vehicle 300 to be selectively driven in both the forward and reverse directions, switch assembly 340 may include a direction, or reversing, switch 352, which is linked with a user-manipulable portion, as described previously, enabling a user to selectively change the direction of rotation of the motors in assembly 232, thereby changing the direction of rotation of the vehicle's wheels.

Switch assembly 340 also includes switches 354, 356 and 358, which cooperate to selectively configure the drive assembly between a high-speed configuration and a low-speed configuration. As described in more detail below, the vehicle's drive assembly may be configured so that the high-speed configuration may only be achieved when the vehicle is being driven in a forward direction. The wiring diagram shown in FIG. 20 includes such a configuration, which as described previously, is a safety feature that prevents a child from driving a vehicle at high speeds in reverse. As shown, circuit-configuring switches 354 and 356 take the form of relays, or may be described as including relay assemblies, 357, and speed-changing switch 358 corresponds to the previously described "turbo switch." Switch 358 is adapted to receive user inputs selecting a high-speed configuration. However, switches 354 and 356 are not turned on when in reverse, thereby preventing user-actuation of turbo switch 358 from causing high-speed, reverse-direction actuation of the vehicle's drive assembly. Such a configuration leaves motors 346 and 348 in series and in a low-speed configuration. When a vehicle is in a forward configuration, switches 354 and 356 are turned on, enabling turbo switch 358 to be activated. Such a configuration puts motors 346 and 348 in parallel and enables the user to select between a high-speed and a low-speed configuration.

As discussed, switch assembly 340 may be actuated via a variety of hand- and foot-actuated mechanisms, which are positioned for actuation by a child sitting on seat 14. As discussed and previously illustrated in FIG. 13, one suitable position for at least one of the user-manipulable mechanisms is on steering mechanism 22. In FIG. 13, steering mechanism 22 of vehicle 300 takes the form of a handlebar assembly that includes handlebars 218 with regions, or handgrips, 220 that are adapted to receive a child's hands during operation of vehicle 300. User-manipulable portion 216 takes the form of a depressible button that is coupled with a switch assembly 212. When a rider sitting on seat 14 presses, or otherwise actuates, portion 216, switch assembly 212 is actuated and selectively configures the ride-on for high-speed and low-speed configurations.

Figure 21:
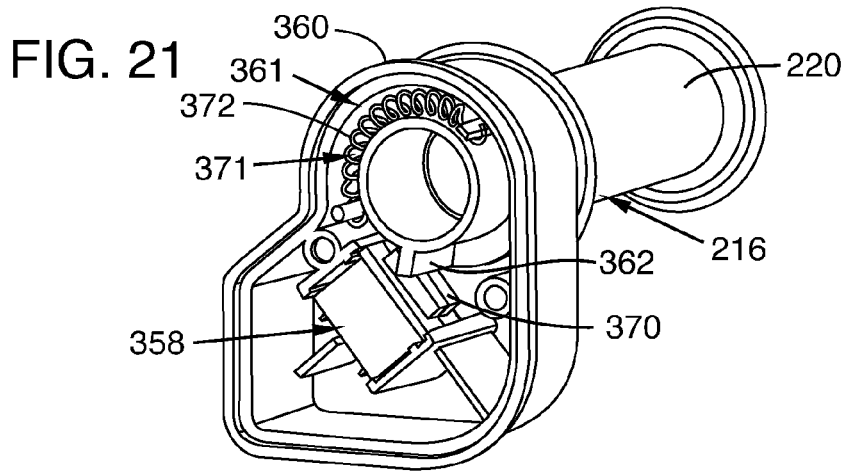
FIG. 21 is an isometric view of a switch assembly coupled with a rotatable handgrip.

Another illustrative construction for this placement of user-manipulable portions is shown in FIG. 21. As shown, user-manipulable portion 216 may be integral with at least one of handgrips 220. In such a configuration, handgrip 220 is rotatably mounted relative to the rest of steering mechanism 22, such that a child sitting on seat 14 may grasp the handgrip and rotate the handgrip, much like a throttle on a full-sized motorcycle. As the child rotates handgrip 220, this user-input is communicated to switch assembly 340, and more particularly, switch 358, to selectively configure the vehicle between its high- and low-speed configurations. Unlike the configuration shown in FIG. 13, in FIG. 21, switch 358 is completely housed within the vehicle's frame, and relies upon a linkage 361 between the user-manipulable portion (handgrip 220) and the mechanical contact 370 of switch 358.

Figure 22:
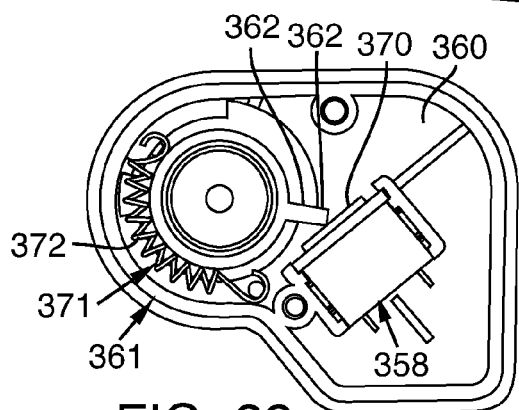
FIG. 22 is a cross-sectional view of the switch assembly of FIG. 21 in an actuated position.
Figure 23:
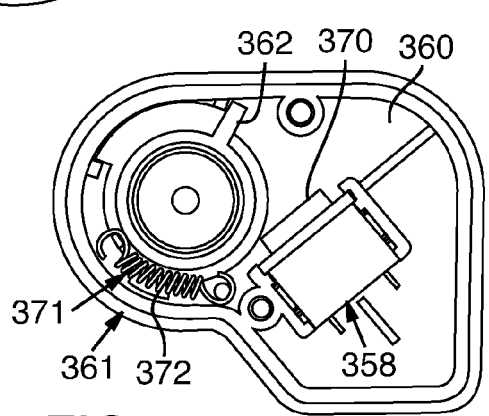
FIG. 23 is a cross-sectional view of the switch assembly of FIG. 21 in a non-actuated position.

As perhaps best seen in FIG. 22, switch 358 is contained within a housing 360, which forms a portion of handlebar 218 and steering mechanism 22. Linkage 361 includes a cam 362 that is rotatably coupled to, or extends from, handgrip 220 such that the cam is rotated with the handgrip. Cam 362 is selectively rotatable between an actuated position, in which the cam actuates the mechanical contact 370 of switch 358, and a non-actuated position, in which mechanical contact 370 is not actuated by the cam. Examples of the actuated and non-actuated positions are shown in FIGS. 22 and 23, respectively. Although illustrated in FIGS. 21-23 as a projecting tooth or rib, cam 362 may have any suitable projecting or eccentric configuration that enables contact 370 to be selectively actuated by the cam upon rotation of handgrip 220. Actuation of contact 370 completes the electrical circuit such that high-speed operation of the vehicle is selected.

Linkage 361 may also include a biasing mechanism 371, such as a coil spring 372, which operates to bias the switch assembly to the low-speed configuration. As seen by comparing FIGS. 22 and 23, rotation of handgrip 220 extends spring 372, such that release of handgrip 220 results in spring 372 recoiling, causing both handgrip 220 and switch assembly 212 to return to their respective low-speed configurations. Thus, high-speed operation of vehicle 300 requires a child to maintain handgrip 220 in a rotated, or rolled-on, position.

Release of handgrip 220 disconnects the electrical circuit and returns the vehicle into a low-speed configuration. It is within the scope of the disclosure that biasing mechanism 371 may additionally or alternatively include other resilient members, such as extension springs, leaf springs, and other deflectable, resilient members.

FIG. 23 illustrates switch assembly 212 in a non-actuated position. In the non-actuated position, cam 362 does not engage contact 370 such that the high-speed electrical configuration is not enabled. Thus, vehicle 300 is in a default low-speed configuration when in the non-actuated position. Additionally, as described above, biasing mechanism 371 may bias switch assembly 212 to a non-actuated position. A benefit of incorporating the user-manipulable portion of switch 358 into handgrip 220 is that a child may select between high- and low-speed configurations of the vehicle without removing the child's hands from the vehicle's handgrips.

As discussed, vehicle 300 includes a plurality of wheels 15. It is within the scope of the disclosure that wheels 15 may have any suitable construction, including molded plastic wheels, hollow wheels, solid wheels, wheels with integral hubs, wheels with removable hubs, pneumatic wheels, etc. Each type of wheel offers various features. For example, a molded plastic wheel will tend to be less expensive, require less assembly and less maintenance than a pneumatic wheel. Pneumatic (inflated) wheels tend to be more expensive and require more maintenance (such as to maintain a desired air pressure or to replace or repair the wheel or a bladder within the wheel) but more closely resemble the wheels used on full-sized vehicles. Hard plastic ground-contacting surfaces are generally more durable than softer, more resilient surfaces, but tend to make more noise on hard surfaces than resilient ground-contacting surfaces.

An example of a wheel assembly 380 that may be (but is not required to be) used for any of wheels 15 is shown in FIG. 24. Wheel assembly 380 includes a core 382. As shown, core 382 is formed from a first core portion 384 and a second core portion 386 that are selectively interconnected via any suitable mechanism. Examples of suitable mechanisms include mechanical fasteners, such as bolts or rivets, mating members on the corresponding portions, such as a snap fit or threaded interconnection, and by adhesive, or chemical bonds. In FIG. 25, it can be seen that core portions 384 and 386 include mating interlocks 387. Interlocks 387 may function to align and secure core portions together. The method of joining the core portions may depend on the materials used for the core portions. It is within the scope of the disclosure that the core may be formed from more than two interconnected portions, and that the core may be a single member, such as shown in FIG. 26.

The core portions may be made of any suitably rigid material, including, but not limited to, hard plastic and metal. An example of a suitable material is polypropylene. Core 382 may also be described as itself providing a wheel for the vehicle. Core portions 384 and 386 may include any number of the features typically found on a wheel rim. For example, as shown in FIG. 24, core portions 384 and 386 include spokes 388, projecting tread portions 389, and a hub 390, which is adapted to receive an axle. Examples of other features include hubcaps, rims, and the like.

In FIGS. 24 and 25, it can be seen that wheel assembly 380 further includes a tread structure 392 that is mounted over the outer surface, or outer circumference, of core 382. Tread structure, or tread portion, 392 resembles the appearance of the external features of a tire, such that completed wheel assembly 380 simulates the appearance of a pneumatic tire on a wheel rim. Any suitable method may be used to attach tread structure 392 to the core. For example, tread structure 392 may be formed separately and then extended or stretched over the outer surface of the core. Alternatively, tread portion 392 may be over-molded or double-shot molded with core 382. When core 382 includes projecting "tread" portions 389, tread structure 392 extends around these portions.

Tread structure 392 typically is formed from a resilient material, such as rubber, soft polyvinylchloride, and the like. The tread structure may also include various patterns of projecting ridges and bumps 395 to simulate knobby tires, all weather tires, snow tires, etc. These projecting portions may at least partially correspond to the "tread" portions 389 on core 382, or may extend from regions of core 382 that do not include a corresponding portion 389. Tread structure 392 provides wheel assembly 380 with the appearance and feel of an actual rubber tire, without the construction requirements necessary for assembly of an actual pneumatic rubber tire. Moreover, because each wheel assembly 380 includes a solid core 382, the wheel assembly does not require inflation and will not become inoperable if punctured.

Unlike known wheel rims, which typically have sunken concave recesses adapted to receive a rubber tube, or bladder, the outer circumference 394 of core 382 of the present wheel assembly may (but does not necessarily) have configurations that are not concave. For example, outer circumference 394 may include, as shown in FIG. 25, a central projection 396 that extends outward away from surface 394. Such a configuration enables tread 392 to be securely coupled to core 382. Additionally, core 382 may include a receiving structure 398 for ends 400 of tread structure 392. Receiving structure 398 enables tread structure 392 to be wrapped at least partially around the sidewalls 399 of core 382. Receiving structure 398 may also be described as providing recesses into which the tread structure extends.

It is within the scope of the present disclosure that the previously described wiring harnesses, turbo switches, rotatable handgrips, wheel assemblies and biased seat assemblies may be used with children's vehicles other than the specific illustrative embodiments shown in the Figures. Similarly, although illustrated together for the sake of brevity, these components may be implemented alone, in selected subcombinations, or all together.

Figure 27:
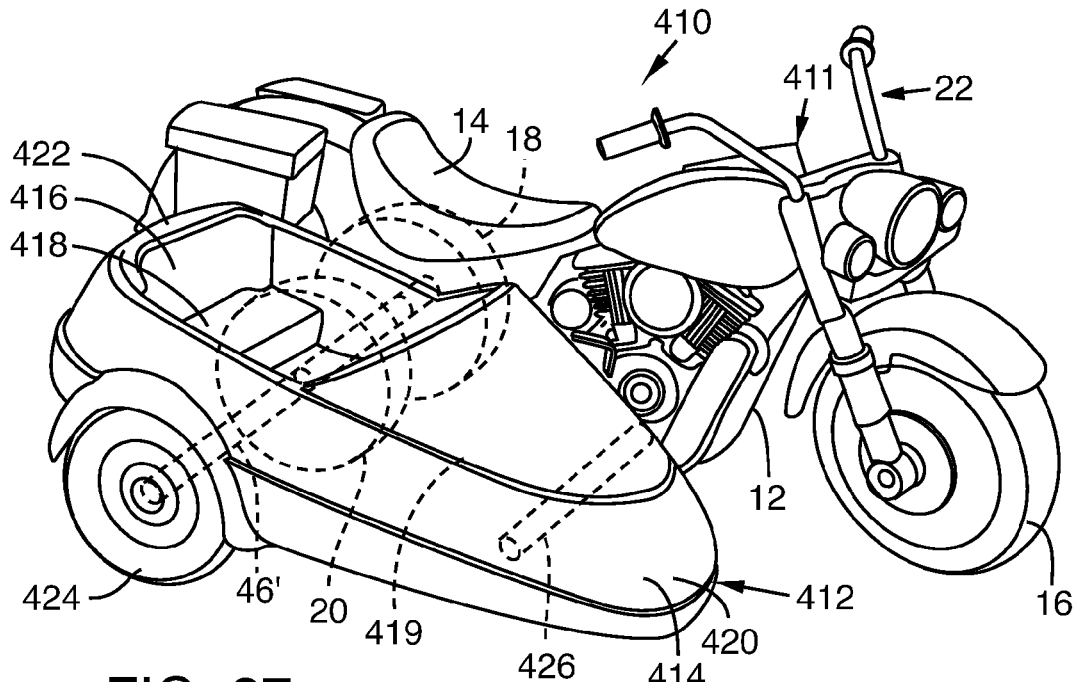
FIG. 27 is an isometric side view of another children's ride-on vehicle and a sidecar.

Another ride-on vehicle is shown generally at 410 in FIG. 27. As with the previously described ride-on vehicles, ride-on vehicle 410 includes a primary vehicle 411 that includes a frame 12, a seat 14, steering mechanism 22, and a plurality of wheels, such as including a front wheel 16 and two rear wheels 18 and 20. Although not illustrated, vehicle 411 may also include a floating rear wheel, similar to rear wheel 24 discussed above. In FIG. 27, vehicle 411 is shown resembling a motorcycle, however, it is within the scope of the disclosure that vehicle 411 may have any suitable body configuration, including, but not limited to, those illustrated in the previously described Figures.

Vehicle 411 also includes a drive assembly. The drive assembly, as with the above-described drive assemblies, may include a battery assembly with one or more batteries and a motor assembly to drive at least one of the vehicle's wheels, such as wheels 18 and 20. The motor assembly may be coupled directly to the driven wheels or may be indirectly coupled to the driven wheels through a motor output linkage assembly, such as gears, belts, etc. Vehicle 411 may further include a wiring harness and switch assembly, such as those described and/or illustrated herein.

Figure 28:
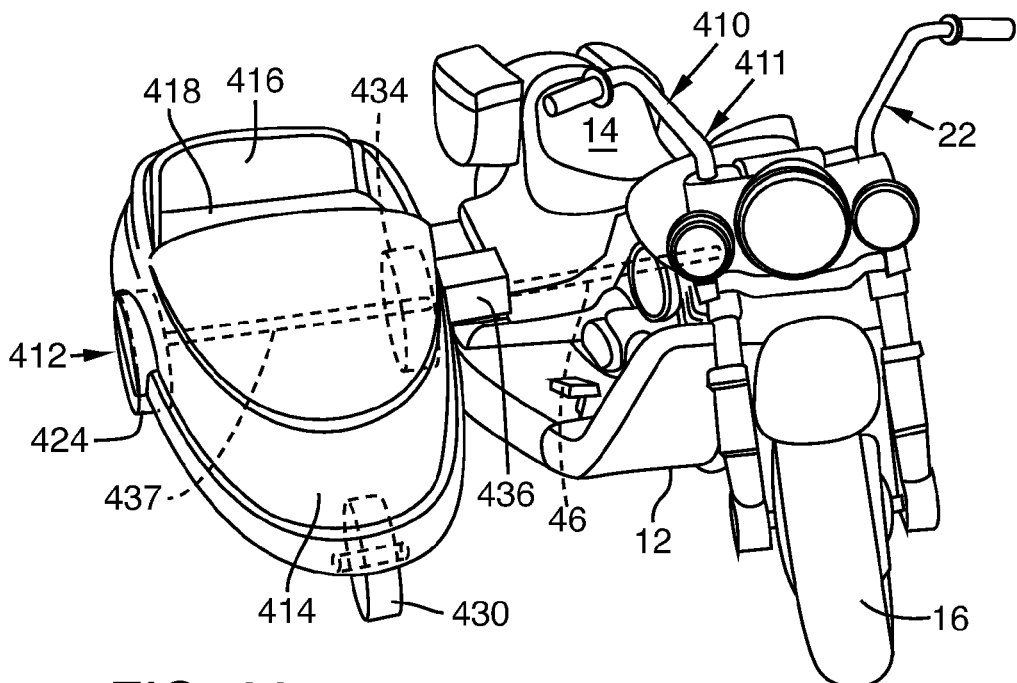
FIG. 28 is an isometric front view of another children's ride-on vehicle and a sidecar.

As shown in FIGS. 27 and 28, vehicle 410 further includes a sidecar 412 that is attached to a side of vehicle 411. For example, and as shown in FIG. 27, sidecar 412 is coupled to the right side of vehicle 411. Sidecar 412 may resemble adult-sized sidecars for motorcycles. Sidecar 412 includes a body, or frame, 414 and a passenger region 416 that is adapted and sized to carry at least one child. In order to accommodate a child, passenger region 416 typically includes at least one seat 418 that is sized to receive at least one child, and a corresponding cavity 419 into which the child's legs extend within body 414. Sidecar 412 may include other features that mimic features found on full-sized sidecars and/or features that make sidecar 412 appealing to children. For example, sidecar 412 may include storage compartments, such as a forward trunk 420, and/or a rear trunk 422. Similarly, sidecar 412 may include a windshield, a dashboard, a glove box, etc.

Sidecar 412 includes at least one wheel 424, and may include at least one additional wheel, such as a second rear wheel and/or a front wheel. For purposes of graphically illustrating various wheel configurations for sidecar 412, a single rear wheel 424 is shown in FIG. 27, and a pair of rear wheels 424 and 434 are shown in FIG. 28. FIG. 28 also illustrates an example of a sidecar 412 having a front wheel 430. In configurations in which the sidecar includes a pair of axially mounted wheels, such as wheels 424 and 434, the wheels may be mounted on a common axle, such as axle 437, which may rotate independent of, or with, an axle 46 on vehicle 411. In a variation of this configuration, the wheels may be axially aligned, yet at least one of the wheels may be separately mounted on an axle or other mount. In configurations in which sidecar 412 includes only a single wheel, such as wheel 424, it may be desirable for the sidecar to include at least one bracket, or support, 426 that interconnects the bodies of the primary vehicle and sidecar 412 to provide additional support thereto. An illustrative example of a suitable support is a metal shaft or rod that extends between vehicle 411 and sidecar 412. One or more supports 426 may also be used in embodiments of sidecar 412 that include more than one wheel. When such a support 426 is used, it is typically spaced forward or rearward of the sidecar's wheel(s).

It is within the scope of the disclosure that none of sidecar's wheels are driven wheels, in which case the wheels are rotated by contact with the ground surface as the vehicle is propelled along the ground surface by its drive assembly. In other words, non-driven wheels rotate in the direction of movement of vehicle 410, but are not coupled to the rotational output of a motor assembly. It is also within the scope of the disclosure that at least one of the sidecar's wheels is a driven wheel. For example, FIG. 27 illustrates an example of a wheel configuration in which the wheel 424 is mounted on a common axle 46 with the driven wheels 18 and 20 of vehicle 411. As another example, vehicle 410 may include a motor assembly that includes at least one motor adapted to drive the rotation of wheel 424, or another of the sidecar's wheels. As a further variation, sidecar 412 may include a separate motor assembly to drive the respective driven wheel(s).

Sidecar 412 may be coupled to vehicle 411 via any suitable structure, including configurations in which the sidecar is adapted to be selectively removed from and reattached to vehicle 411, and configurations in which the sidecar and primary vehicle 411 include a common body or frame or are otherwise constructed so that the sidecar is not designed to be removed and reattached to the primary vehicle. When sidecar 412 is configured to be selectively removed from, and reattached to, vehicle 411, vehicle 410 includes at least one coupling structure 436 that is adapted to selectively secure the sidecar to vehicle 411. Coupling structure 436 is schematically illustrated in FIG. 28 and may include any suitable removable or non-removable coupling device, including, but not limited to, hitches, latches, bolts, hooks, clamps, pins, and/or any other suitable fastening devices.

As described above, a children's ride on vehicle may include a frame adapted to support a child and a drive assembly adapted to drive the vehicle. The vehicle may include multiple features that enhance its appeal to children. For example, the vehicle may resemble a motorcycle and its various components. Features found on adult-sized motorcycles may be simulated in the children's ride-on vehicle. Such features include, but are not limited to, throttles, sidecars, shocks, struts, wheel assemblies, etc. Additionally, the vehicle may include high-speed switches to enable a child to alter the speed of the vehicle. While various alternative embodiments and arrangements of such a children's vehicle have been shown and described above, it will be appreciated by those of skill in the art, that numerous other embodiments, arrangements, and modifications are possible and are within the scope of the disclosure.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A drive assembly for a children's ride-on vehicle, the drive assembly comprising:
   a motor assembly including at least one motor having a rotatable output shaft;
   a battery assembly configured to provide power to the motor assembly, wherein the battery assembly includes at least one battery; and
   an electrical circuit coupling the battery assembly to the motor assembly, the electrical circuit having a first configuration, in which the output shaft rotates at a first speed, and a second configuration, in which the output shaft rotates at a second speed, wherein the electrical circuit includes a speed-changing switch operable by a user and a circuit-configuring switch operable by the speed-changing switch, the circuit-configuring switch has a first operating state, in which the electrical circuit is configured in the first configuration, and a second operating state, in which the electrical circuit is configured in the second configuration, and the speed-changing switch is coupled to the circuit-configuring switch and operable for changing the operating state of the circuit-configuring switch.

2. The drive assembly of claim 1, wherein the motor assembly includes a pair of motors, the pair of motors are connected in series when the electrical circuit is in the first configuration, and the pair of motors are connected in parallel when the electrical circuit is in the second configuration.

3. The drive assembly of claim 1, wherein the electrical circuit has a first directional configuration, in which the motor assembly rotates the output shaft in a first rotational direction, and a second directional configuration, in which the motor assembly rotates the output shaft in a second rotational direction opposite to the first rotational direction, the electrical circuit further comprises a direction switch having a first directional operating state, in which the electrical circuit is in the first directional configuration, and a second directional operating state, in which the electrical circuit is in the second directional configuration, and the electrical circuit is further configured to make the circuit-configuring switch inoperable for changing the operating state of the circuit-configuring switch when the electrical circuit is in the second directional configuration.

4. The drive assembly of claim 3, wherein:
the circuit-configuring switch comprises a relay;
the speed-changing switch is operable to selectively deliver current to the relay to change the operating state of the circuit-configuring switch when the electrical circuit is in the first directional configuration; and
the speed-changing switch is inoperable to deliver current to the relay when the electrical circuit is in the second directional configuration.

5. The drive assembly of claim 1, wherein the circuit-configuring switch includes a biasing mechanism configured to bias the circuit-configuring switch into the first operating state.

6. The drive assembly of claim 1, wherein the electrical circuit coupling the battery assembly to the motor assembly is a first electrical circuit, and the drive assembly further comprises:
a resistive element;
a second electrical circuit coupling the motor assembly and the resistive element; and
a power switch having a first power operating state, in which the power switch completes the first electrical circuit, and a second power operating state, in which the power switch completes the second electrical circuit.

7. The drive assembly of claim 1, wherein the circuit-configuring switch comprises a relay, and the speed-changing switch is operable to selectively deliver current to the relay to change the operating state of the circuit-configuring switch into the second operating state.

8. A children's ride-on vehicle, comprising:
a body and a seat sized to receive a child;
a plurality of wheels including at least one driven wheel and at least one steerable wheel;
a steering assembly coupled to the at least one steerable wheel;
a motor assembly including at least one motor having a rotatable output shaft, wherein the at least one driven wheel is operatively coupled to the output shaft;
a battery assembly configured to provide power to the motor assembly, wherein the battery assembly includes at least one battery; and
an electrical circuit coupling the motor assembly and the battery assembly, the electrical circuit comprising:
a circuit-configuring switch assembly including at least one circuit-configuring switch having a first operating state, in which the circuit-configuring switch at least partially configures the electrical circuit such that the motor assembly rotates the output shaft at a first speed, and a second operating state, in which the circuit-configuring switch at least partially configures the electrical circuit such that the motor assembly rotates the output shaft at a second speed greater than the first speed, wherein the circuit-configuring switch includes a biasing mechanism configured to bias the circuit-configuring switch toward the first operating state; and
a speed-changing switch having a first speed-changing operating state, in which the speed-changing switch configures the circuit-configuring switch into the first operating state, and a second speed-changing operating state, in which the speed-changing switch configures the circuit-configuring switch into the second operating state.

9. The children's ride-on vehicle of claim 8, wherein the electrical circuit coupling the motor assembly and the battery assembly is a first electrical circuit, and the children's ride-on vehicle further comprises:
a resistive element;
a second electrical circuit coupling the motor assembly and the resistive element;
a power switch having a first power operating state, in which the power switch completes the first electrical circuit, and a second power operating state, in which the power switch completes the second electrical circuit; and
a user-manipulable portion, wherein the user-manipulable portion is configured to selectively transition the power switch between the first and second power operating states and to selectively transition the speed-changing switch between the first and second speed-changing operating states.

10. The children's ride-on vehicle of claim 8, wherein the circuit-configuring switch comprises a relay, and the speed-changing switch is configured to deliver current to the relay to configure the circuit-configuring switch into the second operating state when the speed-changing switch is in the second speed-changing operating state.

11. The children's ride-on vehicle of claim 8, wherein the body has a front and a rear, the plurality of wheels includes a non-driven and non-steerable wheel configured to travel within a range of positions relative to the body responsive to external forces imparted to the non-driven and non-steerable wheel, and the non-driven and non-steerable wheel extends rearward of the at least one driven wheel.

12. The children's ride-on vehicle of claim 8, further comprising a frame and a biasing assembly extending generally between the seat and the frame, wherein:
the seat is coupled to the frame for pivotal movement relative to the frame and the biasing assembly includes a biasing structure that is adapted to urge the seat away from the frame to enable pivoting and oscillating movement of the seat relative to the frame from a pivot point forward of the seat;
the biasing assembly includes a first telescoping member and a second telescoping member configured to telescope relative to the first telescoping member; and
the biasing structure is configured to urge the first and the second telescoping members away from each other to enable the pivotal and oscillating movement of the seat relative to the frame.

13. The children's ride-on vehicle of claim 8, wherein the steering assembly includes a handlebar assembly that includes a rotatable handgrip, the speed-changing switch includes a mechanical contact and is housed within the handlebar assembly, and the handgrip is configured to selectively engage the mechanical contact and configure the speed-changing switch into the second speed-changing operating state upon rotation of the handgrip.

14. The children's ride-on vehicle of claim 8, further comprising a sidecar coupled to the vehicle, wherein the sidecar includes a passenger compartment with a sidecar seat sized to receive a child, a sidecar body, and at least one rotatable sidecar wheel.

15. The children's ride-on vehicle of claim 8, wherein at least one of the plurality of wheels includes a wheel assembly that is configured to simulate an inflatable tire having a resilient tread structure yet which includes a rigid core.

16. A children's ride-on vehicle, comprising:
a body having a seat sized to receive a child;
a plurality of wheels including a driven wheel and a steerable wheel;
a steering assembly coupled to the steerable wheel;
a motor assembly including a pair of motors, each of the motors having a rotatable output shaft, wherein the driven wheel is operatively coupled to the rotatable output shaft of at least one of the pair of motors;
a battery assembly configured to provide power to the motor assembly, wherein the battery assembly includes at least one battery; and
an electrical circuit coupling the motor assembly and the battery assembly, the electrical circuit comprising:
a circuit-configuring switch assembly including at least one circuit-configuring switch having a first operating state, in which the circuit-configuring switch at least partially configures the electrical circuit such that the pair of motors are connected in series, and a second operating state, in which the circuit-configuring switch at least partially configures the electrical circuit such that the pair of motors are connected in parallel, wherein the circuit-configuring switch includes a relay and a biasing mechanism configured to bias the circuit-configuring switch toward the first operating state;
a speed-changing switch having a first speed-changing operating state, in which the speed-changing switch configures the circuit-configuring switch into the first operating state, and a second speed-changing operating state, in which the speed-changing switch is configured to deliver current to the relay to configure the circuit-configuring switch into the second operating state; and
a power switch having a first power operating state, in which the electrical circuit is completed, and a second power operating state, in which the electrical circuit is not completed.

17. The children's ride-on vehicle of claim 16, wherein:
the circuit-configuring switch is a first circuit-configuring switch, the relay is a first relay, and the biasing mechanism is a first biasing mechanism;
the circuit-configuring switch assembly further includes a second circuit-configuring switch having a third operating state, in which the second circuit-configuring switch at least partially configures the electrical circuit such that the pair of motors are connected in series, and a fourth operating state, in which the second circuit-configuring switch at least partially configures the electrical circuit such that the pair of motors are connected in parallel, wherein the second circuit-configuring switch includes a second relay and a second biasing mechanism configured to bias the second circuit-configuring switch toward the third operating state; and
the speed-changing switch, when in the first speed-changing operating state, configures the second circuit-configuring switch into the third operating state, and the speed-changing switch is configured to deliver current to the second relay to configure the second circuit-configuring switch into the fourth operating state when the speed-changing switch is in the second speed-changing operating state.

18. The children's ride-on vehicle of claim 17, further comprising a direction switch having a forward directional operating state, in which the direction switch configures the electrical circuit such that the motor assembly rotates the output shaft in a first rotational direction, and a reverse directional operating state, in which the direction switch configures the electrical circuit such that the motor assembly rotates the output shaft in a second rotational direction opposite to the first rotational direction, wherein:
the electrical circuit is a first electrical circuit,
a second electrical circuit couples the battery assembly and the first and second relays,
the direction switch completes the second electrical circuit when the direction switch is in the forward directional operating state,
the direction switch does not complete the second electrical circuit when the direction switch is in the reverse directional operating state, and
the speed-changing switch is configured to deliver current to the first and second relays to configure the first and second circuit-configuring switches into the second and fourth operating states when the speed-changing switch is in the second speed-changing operating state and the direction switch is in the forward directional operating state.

19. The children's ride-on vehicle of claim 16, further comprising a user-manipulable portion, wherein the user-manipulable portion is configured to selectively transition the power switch between the first and second power operating states and to selectively transition the speed-changing switch between the first and second speed-changing operating states.

20. The children's ride-on vehicle of claim 16, further comprising a resistive element, wherein the electrical circuit coupling the motor assembly and the battery assembly is a first electrical circuit, a second electrical circuit couples the motor assembly and the resistive element, and the power switch completes the second electrical circuit when the power switch is in the second power operating state.

* * * * *